US009862433B2

(12) United States Patent
Martel

(10) Patent No.: US 9,862,433 B2
(45) Date of Patent: Jan. 9, 2018

(54) COMPACT DRIVE UNIT INCLUDING JUXTAPOSED TRACKS

(71) Applicant: Yvon Martel, Chicoutimi (CA)

(72) Inventor: Yvon Martel, Chicoutimi (CA)

( * ) Notice: Subject to any disclaimer, the term of this patent is extended or adjusted under 35 U.S.C. 154(b) by 0 days.

(21) Appl. No.: 15/607,601

(22) Filed: May 29, 2017

(65) Prior Publication Data

US 2017/0267296 A1    Sep. 21, 2017

Related U.S. Application Data

(63) Continuation of application No. 14/689,890, filed on Apr. 17, 2015, now Pat. No. 9,694,859, which is a
(Continued)

(51) Int. Cl.
 *B62D 55/00* (2006.01)
 *B62D 51/00* (2006.01)
(Continued)

(52) U.S. Cl.
 CPC ............ *B62D 51/007* (2013.01); *A63C 11/10* (2013.01); *B60P 1/04* (2013.01); *B62D 51/02* (2013.01); *B62D 51/04* (2013.01); *B62D 55/07* (2013.01); *B62M 27/02* (2013.01); *H01M 10/625* (2015.04); *H01M 10/6561* (2015.04); *H01M 10/06* (2013.01)

(58) Field of Classification Search
 CPC ........ A63C 5/08; A63C 5/085; B62D 51/007; B62D 51/02; B62D 51/04; H01M 10/6561; H01M 10/625; B60K 6/20; B60K 11/06; B60K 11/08; B60K 13/00; B60K 13/02; B60K 13/04
 See application file for complete search history.

(56) References Cited

U.S. PATENT DOCUMENTS 758,757 A    5/1904    Jones
1,287,261 A    12/1918    Domer
(Continued)

FOREIGN PATENT DOCUMENTS

CA    2135653 A1    9/1996
CA    2294527 A1    12/1998
(Continued)

OTHER PUBLICATIONS

Machine translation in English of CN-102009588A.
(Continued)

*Primary Examiner* — James A Shriver, II
*Assistant Examiner* — Steve Clemmons
(74) *Attorney, Agent, or Firm* — Ipaxio S.E.N.C.

(57) ABSTRACT

The drive unit includes a watertight elongated housing extending along a longitudinal axis and defining an inner chamber, two juxtaposed tracks disposed around the housing along its longitudinal axis and enabling the drive unit to move when the tracks are rotatably driven around the housing, and at least one track-driving motor. The motor is located within the inner chamber of the housing and includes an output shaft mechanically connected to the corresponding track. The unit can also include a ventilation circuit for the interior of the inner chamber of the housing, and a generator for producing electricity. The drive unit can be manufactured from a single housing or with the housings of two apparatuses that are juxtaposed and rigidly paired.

20 Claims, 18 Drawing Sheets

Related U.S. Application Data continuation of application No. PCT/CA2012/050747, filed on Oct. 19, 2012.

(51) Int. Cl.

| | |
|---|---|
| *A63C 11/10* | (2006.01) |
| *B62D 51/02* | (2006.01) |
| *B62D 51/04* | (2006.01) |
| *B62M 27/02* | (2006.01) |
| *H01M 10/6561* | (2014.01) |
| *B60P 1/04* | (2006.01) |
| *B62D 55/07* | (2006.01) |
| *H01M 10/625* | (2014.01) |
| *H01M 10/06* | (2006.01) |

(56) References Cited

U.S. PATENT DOCUMENTS

| | | |
|---|---|---|
| 1,317,103 A | 9/1919 | Rimailho |
| 1,694,790 A | 12/1928 | Nelson |
| 2,046,560 A | 7/1936 | Johnson et al. |
| 2,171,846 A | 9/1939 | Davidson |
| 2,196,458 A | 4/1940 | Flynn et al. |
| 2,289,768 A | 7/1942 | Fehrenbacher |
| 2,345,496 A | 3/1944 | Opheim |
| 2,393,309 A | 1/1946 | Cochran |
| 2,519,745 A | 8/1950 | Danielson et al. |
| 2,702,088 A | 2/1955 | Klimek |
| 2,855,059 A | 10/1958 | Sutherland |
| 2,887,343 A | 5/1959 | West |
| 3,068,950 A | 12/1962 | Davidson |
| 3,146,840 A | 9/1964 | Walsh |
| 3,158,882 A | 12/1964 | Kibby |
| 3,198,273 A | 8/1965 | Turpen, Jr. |
| 3,221,830 A | 12/1965 | Walsh |
| 3,231,036 A | 1/1966 | Appenrodt |
| 3,259,200 A | 7/1966 | Maijala |
| 3,269,475 A | 8/1966 | Voelker |
| 3,311,424 A | 3/1967 | Taylor |
| 3,382,943 A | 5/1968 | Anderson |
| 3,398,806 A | 8/1968 | Hendricks |
| 3,405,777 A | 10/1968 | Von Kemenczky |
| 3,418,961 A | 12/1968 | Gregg |
| 3,427,078 A | 2/1969 | Parsons |
| 3,446,304 A | 5/1969 | Alimanestiano |
| 3,509,955 A | 5/1970 | Lichfield |
| 3,512,658 A | 5/1970 | Harlan |
| 3,540,152 A | 11/1970 | Beny et al. |
| 3,554,300 A | 1/1971 | Rosenberg |
| 3,568,787 A | 3/1971 | Gremeret |
| 3,590,523 A | 7/1971 | Riesgraf |
| 3,610,355 A | 10/1971 | Buck |
| 3,645,348 A | 2/1972 | Thompson |
| 3,734,221 A | 5/1973 | Labelle |
| 3,750,777 A | 8/1973 | Thompson |
| 3,773,127 A | 11/1973 | Aaen et al. |
| 3,789,941 A | 2/1974 | Robertson |
| 3,809,173 A | 5/1974 | McLeod |
| 3,826,323 A | 7/1974 | Mehne |
| 3,850,130 A | 11/1974 | Heuschober |
| 3,853,192 A | 12/1974 | Husted |
| 3,964,560 A | 6/1976 | Husted |
| 4,096,919 A | 6/1978 | Thompson |
| 4,102,292 A | 7/1978 | Hunter et al. |
| 4,146,101 A | 3/1979 | Plourde |
| 4,175,627 A | 11/1979 | Husted |
| 4,257,652 A | 3/1981 | Edwards |
| 4,421,193 A | 12/1983 | Bissett |
| 4,433,634 A | 2/1984 | Coast |
| 4,519,470 A | 5/1985 | Allisio |
| 4,548,315 A | 10/1985 | Briggs |
| 4,645,022 A | 2/1987 | Bergquist |
| 4,747,457 A | 5/1988 | Buscaiolo et al. |
| 4,789,037 A | 12/1988 | Kneebone |
| 4,958,584 A | 9/1990 | Williamson |
| 4,981,188 A | 1/1991 | Kadela |
| 4,984,648 A | 1/1991 | Strzok |
| 5,064,011 A | 11/1991 | Ogano et al. |
| 5,174,405 A | 12/1992 | Carra et al. |
| 5,181,478 A | 1/1993 | Berardi |
| 5,193,632 A | 3/1993 | Clar et al. |
| 5,332,058 A | 7/1994 | Bianco |
| 5,363,937 A | 11/1994 | James |
| 5,499,734 A | 3/1996 | Tessmer |
| 5,662,186 A | 9/1997 | Welch |
| 5,799,743 A | 9/1998 | Robinson |
| 5,828,967 A | 10/1998 | Ueda |
| 6,193,003 B1 | 2/2001 | Dempster |
| 6,408,962 B1 | 6/2002 | Ryckman |
| 6,571,893 B2 | 6/2003 | De-Noor et al. |
| 6,691,806 B2 | 2/2004 | Wolfgang et al. |
| 6,725,959 B1 | 4/2004 | Shea et al. |
| 6,880,651 B2 | 4/2005 | Loh et al. |
| 7,017,998 B2 | 3/2006 | Ducharme |
| 7,131,507 B2 | 11/2006 | Wenger et al. |
| 7,337,760 B2 | 3/2008 | Digregorio |
| 7,343,644 B2 | 3/2008 | Elmer |
| 7,389,842 B2 | 6/2008 | Inoguchi et al. |
| 7,434,644 B2 | 10/2008 | Wier |
| 7,543,664 B2 | 6/2009 | Nelson |
| 7,575,075 B2 | 8/2009 | Fairhead |
| 7,757,797 B2 | 7/2010 | Dobereiner |
| 7,758,467 B2 | 7/2010 | Ashizawa et al. |
| 7,798,886 B1 | 9/2010 | Williamson |
| 7,826,941 B2 | 11/2010 | Hayashi et al. |
| 7,886,399 B2 | 2/2011 | Dayton et al. |
| 7,905,310 B2 | 3/2011 | Hues |
| 7,980,569 B2 | 7/2011 | Azure et al. |
| 8,002,059 B2 | 8/2011 | Tanishima |
| 8,030,860 B2 | 10/2011 | Yoshioka |
| 8,453,769 B2 | 6/2013 | Martel |
| 8,465,103 B2 | 6/2013 | Burt et al. |
| 8,528,672 B2 | 9/2013 | Martel |
| 8,827,014 B2 | 9/2014 | Martel |
| 2004/0004395 A1 | 1/2004 | Soucy et al. |
| 2007/0209847 A1 | 9/2007 | Schultz et al. |
| 2007/0227791 A1 | 10/2007 | Ueno |
| 2008/0023233 A1 | 1/2008 | Westergaard |
| 2009/0308667 A1 | 12/2009 | Westerdaard |
| 2011/0011652 A1 | 1/2011 | Swenson |
| 2012/0110878 A1 | 5/2012 | Mayer et al. |
| 2012/0225596 A1 | 9/2012 | Schmidt et al. |
| 2015/0217815 A1 | 8/2015 | Martel |
| 2016/0121944 A1 | 5/2016 | Martel |

FOREIGN PATENT DOCUMENTS

| | | |
|---|---|---|
| CA | 2762353 A1 | 10/2011 |
| CA | 2772513 A1 | 10/2011 |
| CA | 2776417 A1 | 10/2011 |
| CN | 102009588 A | 4/2011 |
| CN | 102490718 A | 6/2012 |
| CN | 102632782 A | 8/2012 |
| CN | 202728389 U | 2/2013 |
| DE | 4409677 A1 | 8/1994 |
| EP | 0091707 A1 | 10/1983 |
| EP | 0485630 A1 | 5/1992 |
| EP | 0572880 A1 | 12/1993 |
| EP | 1924487 B1 | 7/2009 |
| EP | 2239182 A1 | 10/2010 |
| FR | 1169880 A | 1/1959 |
| FR | 2431304 A1 | 2/1980 |
| FR | 2450191 A1 | 9/1980 |
| FR | 2604367 A1 | 4/1988 |
| FR | 2673545 A1 | 9/1992 |
| FR | 2688701 A1 | 9/1993 |
| FR | 2893585 A1 | 5/2007 |
| GB | 140121 A | 3/1920 |
| GB | 1042943 A | 9/1966 |
| GB | 2144689 A | 3/1985 |
| GB | 2390837 A | 1/2004 |
| JP | 4843545 Y1 | 12/1973 |
| JP | 62194187 U | 12/1987 |

(56) References Cited

FOREIGN PATENT DOCUMENTS

| | | |
|---|---|---|
| JP | 04169339 A | 6/1992 |
| JP | 04228325 A | 8/1992 |
| JP | 2007182137 A | 7/2007 |
| JP | 2004089118 A | 3/2015 |
| RU | 119318 U1 | 8/2012 |
| WO | 9415683 A1 | 7/1994 |
| WO | 2012140973 A1 | 10/2012 |
| WO | 2014059511 A1 | 4/2014 |
| WO | 2015003262 A1 | 1/2015 |

OTHER PUBLICATIONS

Machine translation in English of CN-102490718A.
Machine translation in English of CN-102632782A.
Machine translation in English of CN-202728389U.
Machine translation in English of JP-04169339A.
Machine translation in English of JP-04228325A.
Machine translation in English of JP-48-43535Y1.
Machine translation in English of JP-62-194187U.
Machine translation in English of RU-119318U1.
Machine translation in English of WO-2012140973A1.
Machine translation in English of WO 94/15683.
Machine translation in English of JP-2004089118.
English translation of the International Preliminary Report on Patentability for PCT/CA2012/050747.

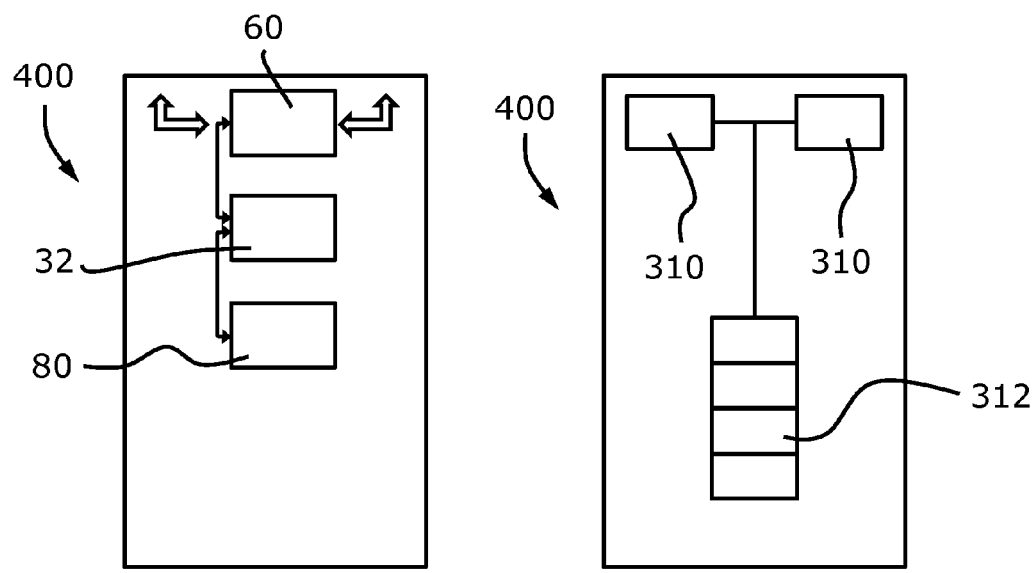
FIG. 19  FIG. 20
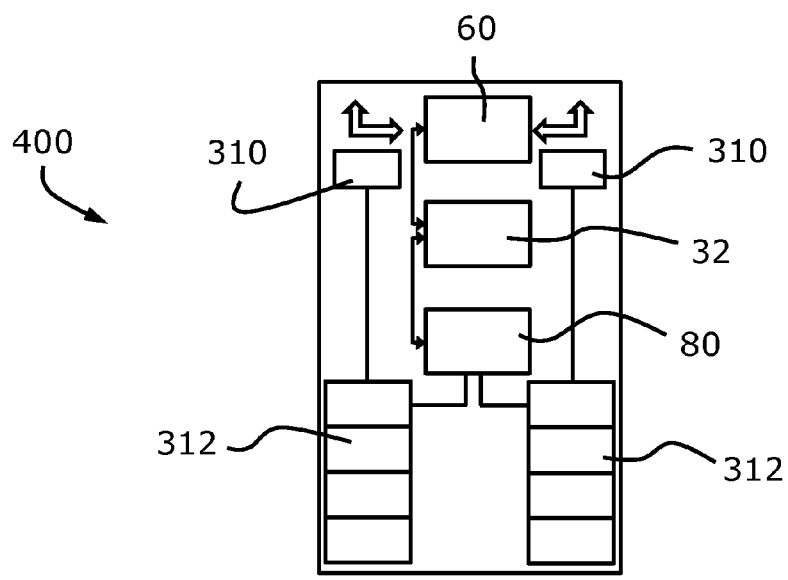
FIG. 21

COMPACT DRIVE UNIT INCLUDING JUXTAPOSED TRACKS

CROSS REFERENCE TO PRIOR APPLICATIONS

The present case is a continuation of U.S. patent application Ser. No. 14/689,890 filed on 17 Apr. 2015. U.S. patent application Ser. No. 14/689,890 is a continuation of PCT patent application Ser. No. PCT/CA2012/050747 filed on 19 Oct. 2012. The present case is also an improvement of the concept disclosed in PCT patent application Ser. No. PCT/CA2011/050202 filed on 15 Apr. 2011 by the same inventor. The entire content of all these prior applications is hereby incorporated by reference.

TECHNICAL FIELD

The technical field relates generally to compact pulling apparatuses and to compact drive units capable of travelling over difficult terrains, such as terrains covered with snow, sand, mud, etc.

TECHNICAL BACKGROUND

Various apparatuses have been suggested over the years for travelling on difficult terrains. Of these, several are compact apparatuses allowing one person, such as a person on skis, to be pushed or pulled using a track rotatably driven by a motor. Examples can be found in documents FR-2,431,304 (Jaulmes) published on 15 Feb. 1980 and in U.S. Pat. No. 4,519,470 (Allisio) published on 28 May 1985. Numerous other examples exist. Most of these apparatuses use a gasoline engine to rotatably drive the track. Some use an electric motor. Apparatuses of this sort can be useful as light means of transportation, especially where it is difficult or even forbidden to travel using a larger vehicle. For example, in terrains with a snow-covered surface, the snow could be too powdery or too deep to use a snowmobile. Another advantage of such apparatuses is that it is much simpler and easier to transport them in another vehicle than is the case with a larger and heavier vehicle, for instance a snowmobile.

Unfortunately, none of these previously-suggested apparatuses has proven fully adapted to the very rigorous winter conditions encountered during parts of the year in places where such apparatuses are likely to be useful. For instance, a very cold temperature can significantly hinder the reliability and the autonomy of an apparatus having an electric motor powered using batteries. In the case of a gasoline engine, the combination of cold weather and heat released from the engine can cause ice and compacted snow to build up at sensitive points of the apparatus. Moreover, milder temperatures are more likely to cause water infiltrations into the apparatus, which can then result in failures difficult to repair, especially if they occur deep into the forest or in other places that are difficult to access.

Also, the previously-suggested apparatuses do not allow an electric generator and/or a payload to be easily transported to places that are difficult to access, for instance places where space is limited, on rough terrains and/or on very soft terrains.

PCT patent application Ser. No. PCT/CA2011/050202, published on 20 Oct. 2011 under number WO 2011/127607, presents significant improvements in the related technical field. This patent application is from the same inventor as the present application. WO 2011/127607 discloses, among other things, various embodiments of a compact pulling apparatus that can easily travel on difficult terrains, such as terrains covered with snow, sand, mud, etc. This apparatus opens the way to many other improvements in the transport sector in general. Several solutions to problems and to specific needs in this general area have been suggested, such as having an improved drive unit can be used in many implementations.

SUMMARY

According to one aspect, there is provided a transport drive unit, including: two compact pulling apparatuses that are juxtaposed and rigidly paired, each apparatus including: a watertight elongated housing extending along a longitudinal axis and defining an inner chamber, the housing including a top wall and a bottom wall; a track disposed around the housing along its longitudinal axis; a track-driving motor, the motor being located within the inner chamber of the housing and including an output shaft mechanically connected to the track; and a ventilation circuit for the inner chamber of the housing, the ventilation circuit including an air inlet and an air outlet which communicate with outside of the housing, the ventilation circuit allowing the temperature within the inner chamber to be kept above the freezing point when the outside temperature is lower and allowing the interior of the inner chamber to be cooled when its temperature exceeds an upper threshold.

According to another aspect, there is provided a transport drive unit including: a watertight elongated housing extending along a longitudinal axis and defining an inner chamber, the housing including a top wall and a bottom wall; two juxtaposed tracks disposed in parallel around the housing along its longitudinal axis and which enable the unit to move when the tracks are rotatably driven around the housing; at least one track-driving motor, the motor being located within the inner chamber of the housing and including an output shaft mechanically connected to at least one of the tracks; and a ventilation circuit for the inner chamber of the housing, the ventilation circuit including an air inlet and an air outlet which communicate with outside of the housing, the ventilation circuit allowing the temperature within the inner chamber to be kept above the freezing point when the outside temperature is lower and allowing the interior of the inner chamber to be cooled when its temperature exceeds an upper threshold.

According to another aspect, there is provided a method of using a transport drive unit of the type including a watertight elongated housing extending along a longitudinal axis and defining an inner chamber inside which a motor is located, and also including two juxtaposed tracks disposed around the housing along its longitudinal axis and which enable the apparatus to move when at least one of the tracks is rotatably driven around the housing by the motor; the method including the following simultaneous steps: maintaining a minimum temperature in the inner chamber using heat released from the motor or motors; evacuating heat from within the inner chamber if the temperature exceeds a given threshold; maintaining a positive pressure within the inner chamber in operation; simultaneously using the two tracks to move the drive unit; and moving at least a payload that is temporarily placed on the drive unit.

According to another aspect, there is also provided a method for manufacturing a unit as previously defined.

According to another aspect, there is also provided the use of a drive unit as previously defined, wherein the unit travels over a snow-covered terrain and/or a rough terrain and/or a muddy terrain.

More details on these aspects, as well as on other aspects of the proposed concept, will become apparent in light of the detailed description which follows and the appended figures.

BRIEF DESCRIPTION OF THE FIGURES

FIGS. 13 to 21 are top schematic views illustrating different examples of configurations inside the compact drive unit;

DETAILED DESCRIPTION

Figure 1:
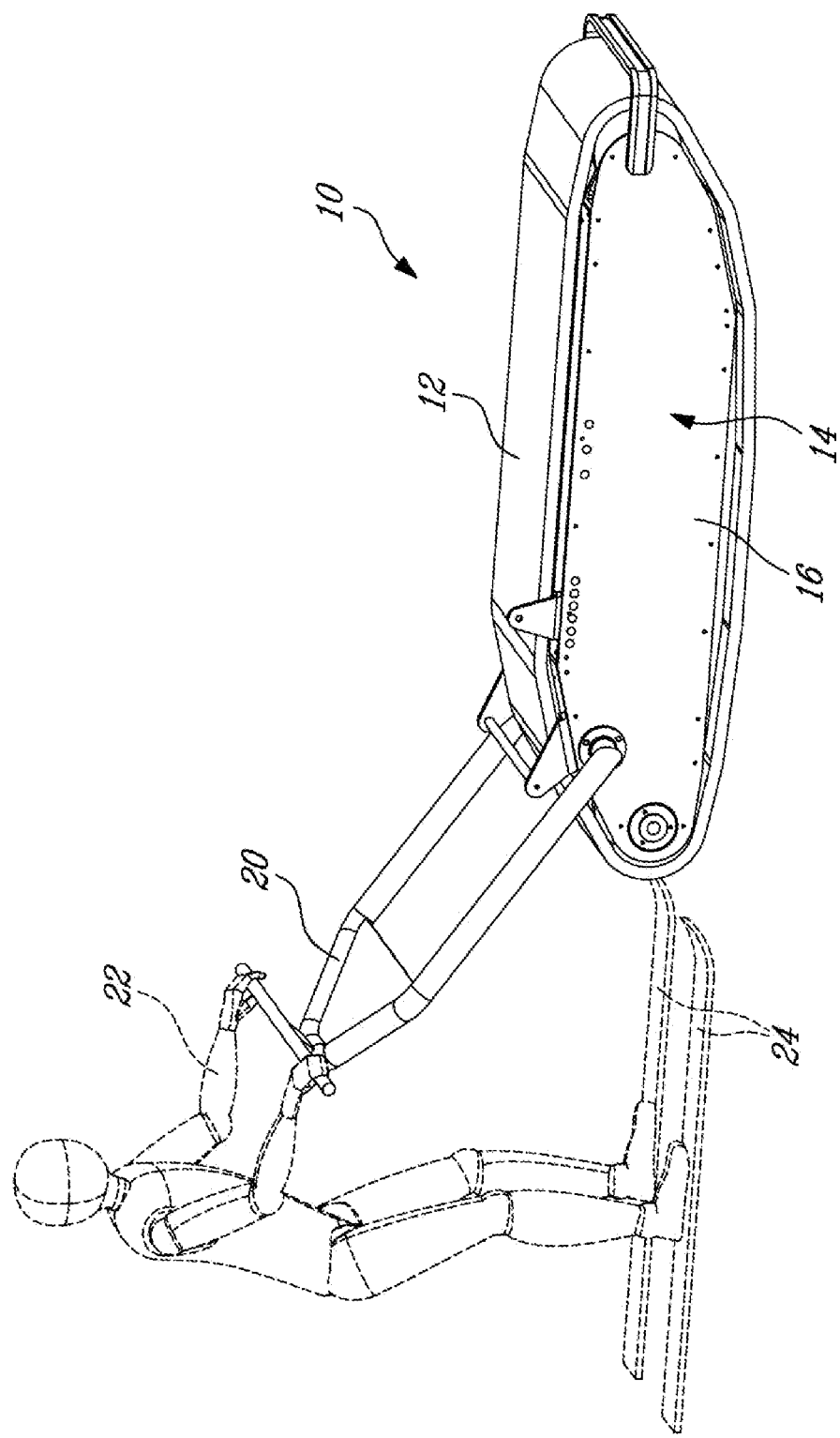
FIG. 1 is an isometric view of an example of an apparatus illustrated in PCT patent application Ser. No. PCT/CA2011/050202 published under number WO 2011/127607, this example using an internal-combustion engine.

FIG. 1 is an isometric view of an example of an apparatus 10 illustrated in PCT patent application Ser. No. PCT/CA2011/050202 published under number WO 2011/127607. FIGS. 2 to 9 are also views from this same PCT application. FIGS. 1 to 9 as well as the following description text about these figures are provided for reference purposes. The proposed concept in the present application includes improvements over what is shown in FIGS. 1 to 9 and offers new possibilities.

In the example of FIG. 1, the apparatus 10 uses an internal-combustion engine to rotate a track 12 disposed around a watertight housing 14 having an elongated shape. It should be noted at this point that the reference to a "watertight" housing means that its construction is watertight but this does not exclude the presence of a ventilation circuit for the interior of the housing 14. This ventilation circuit includes at least one air inlet and at least one air outlet. The ventilation circuit makes it possible, among other things, to cool the interior of the housing 14 when its temperature exceeds an upper threshold, for example above 25° C. Other values are also possible.

The rotation of the track 12 around the housing 14 enables the apparatus 10 to move. The housing 14 is low-slung in order to keep its center of gravity as low as possible. The housing 14 includes a lateral wall 16 on each side, which can be made removable to facilitate access to the interior. The housing 14 can, for instance, be made of a metallic material, of a plastic material, or both. Aluminum is an example of one possible material for the housing 14 since this material is light and strong. The track 12 can be made of rubber or of another polymer. Other materials are possible.

The apparatus 10 of this example includes a handlebar 20 which is connected to the housing 14. The handlebar 20 extends substantially rearward of the apparatus 10. The handlebar 20 is intended to be held and manipulated by an operator 22 who is at the rear of the apparatus 10, as shown in a semi-schematic manner in FIG. 1. The handlebar 20 can be pivotal or fixed, depending on the needs. When pivotal, it is possible to limit the pivoting of the handlebar 20 between a minimum angle and a maximum angle with reference to the horizontal. The handlebar 20 could also be omitted in certain embodiments or even be replaced by another arrangement.

Figure 6:
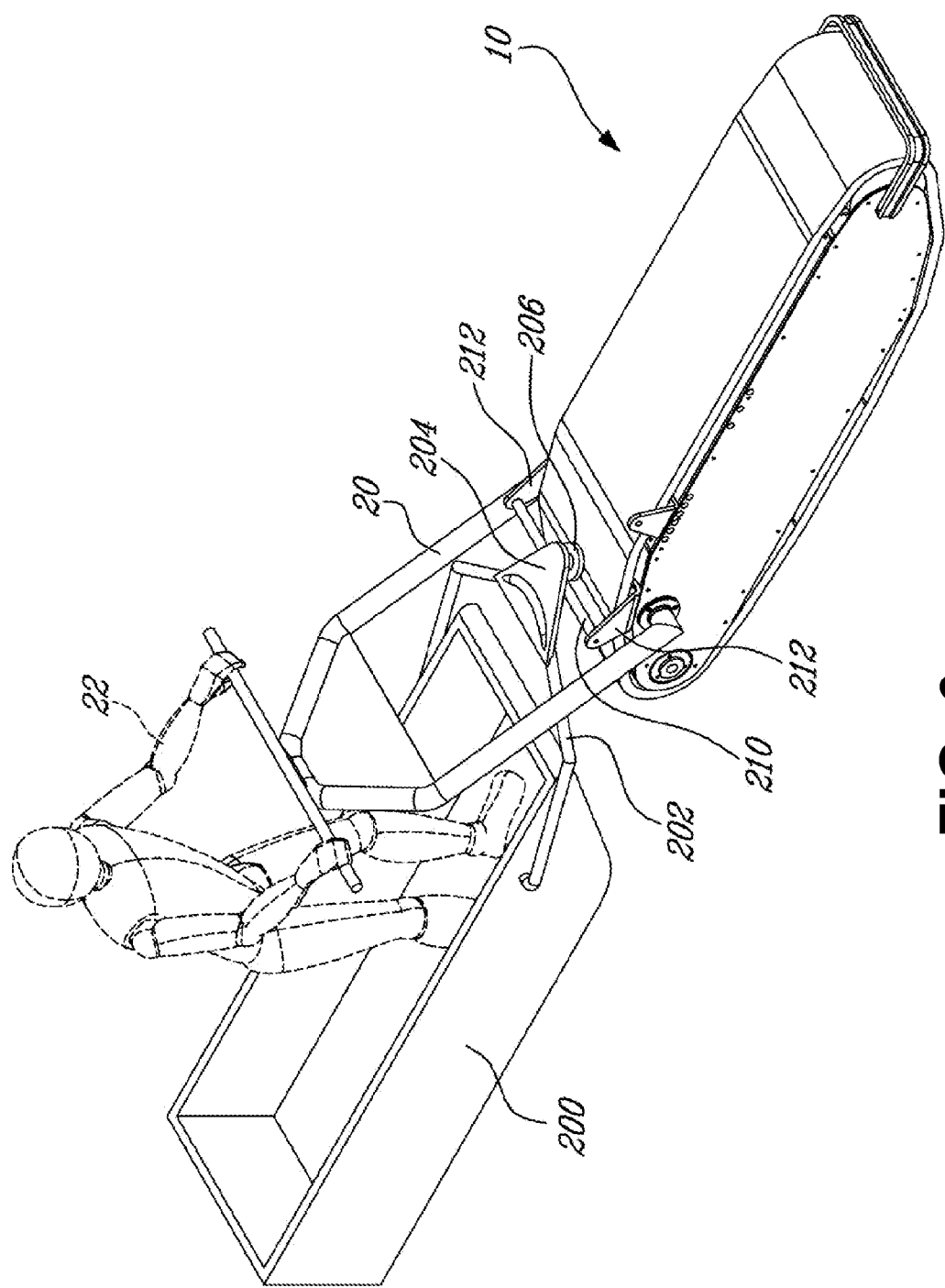
FIG. 6 is a view similar to FIG. 1 but where the operator is standing on a sled hitched to the apparatus.

The operator 22 can be provided with skis 24 (or the equivalent) or be on board a sled hitched to the apparatus 10 (FIG. 6). As can be seen in FIG. 1, the center of gravity of the apparatus 10 is at a height that is below the knees of the operator 22.

The operator 22 of the apparatus 10 shown in FIG. 1 has controls (not shown) available on the handles of the handlebar 20 which allow, among other things, controlling the travel speed of the apparatus 10 and other functions. The controls can be connected to the housing 14 using wires and/or by wireless communication means. Depending on the model, it is, among other things, possible to provide an arrangement which enables the apparatus 10 to back up by its own motor power, which can be very useful in certain circumstances. Levers for operating a brake can also be provided. These levers can be placed similarly to those of the brakes on a bicycle or a motorcycle, for instance. Other elements can be provided on the handlebar 20 according to the needs, such as a lamp, indicator dials, etc. Many other variants are possible.

When travelling forward, the apparatus 10 pulls the operator 22 along and, if applicable, moves a payload, for instance a payload placed on board a sled hitched to the apparatus 10. Such apparatus 10 can easily pull a load equivalent to twice its own weight in powder snow. For example, tests carried out using an apparatus weighing 125 kg (275 lbs) have shown that such an apparatus, even alone, was able to pull a load of 225 kg (550 lbs) over a distance of 150 km on a single fuel tank.

The operator 22 of the apparatus 10 shown in FIG. 1 can change the travel direction of the apparatus 10 by moving the handlebar 20 sideways in the direction opposite the turn to be made. This action is similar to the one made by the operator of a small conventional lawn mower. Variants are also possible.

Figure 2:
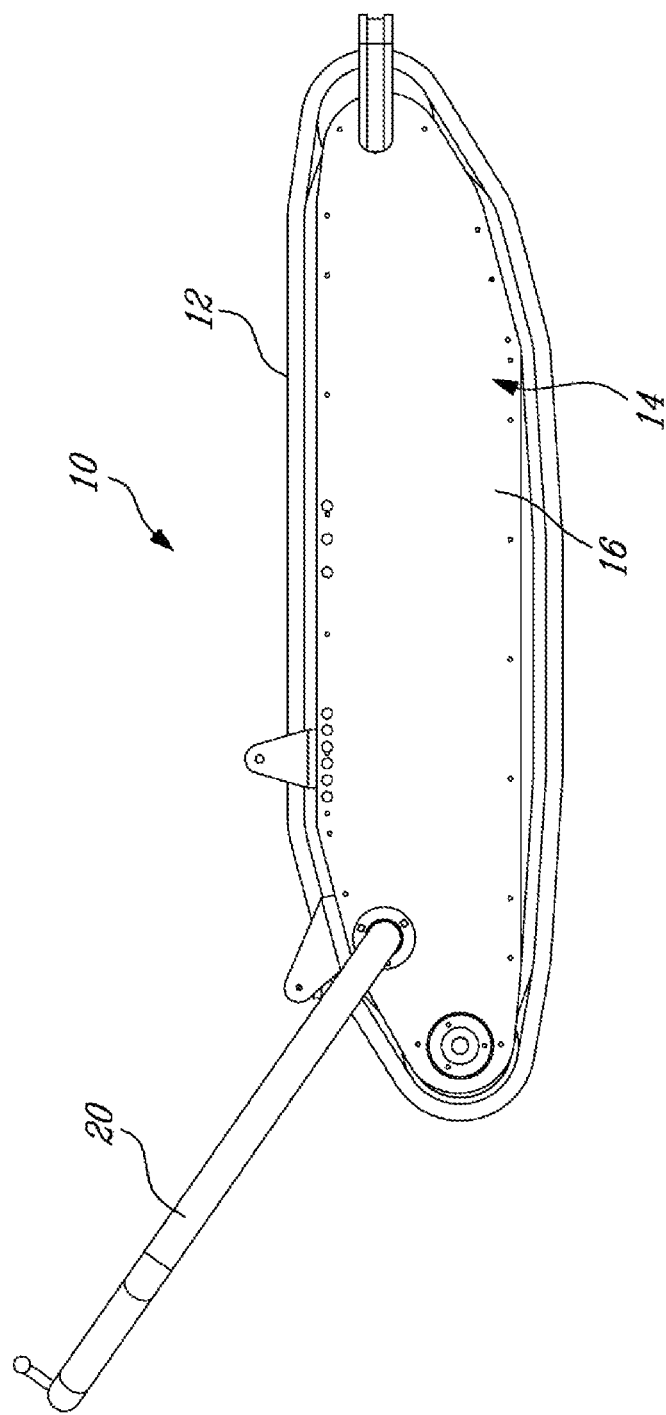
FIG. 2 is a side view of the apparatus shown in FIG. 1.
Figure 3:
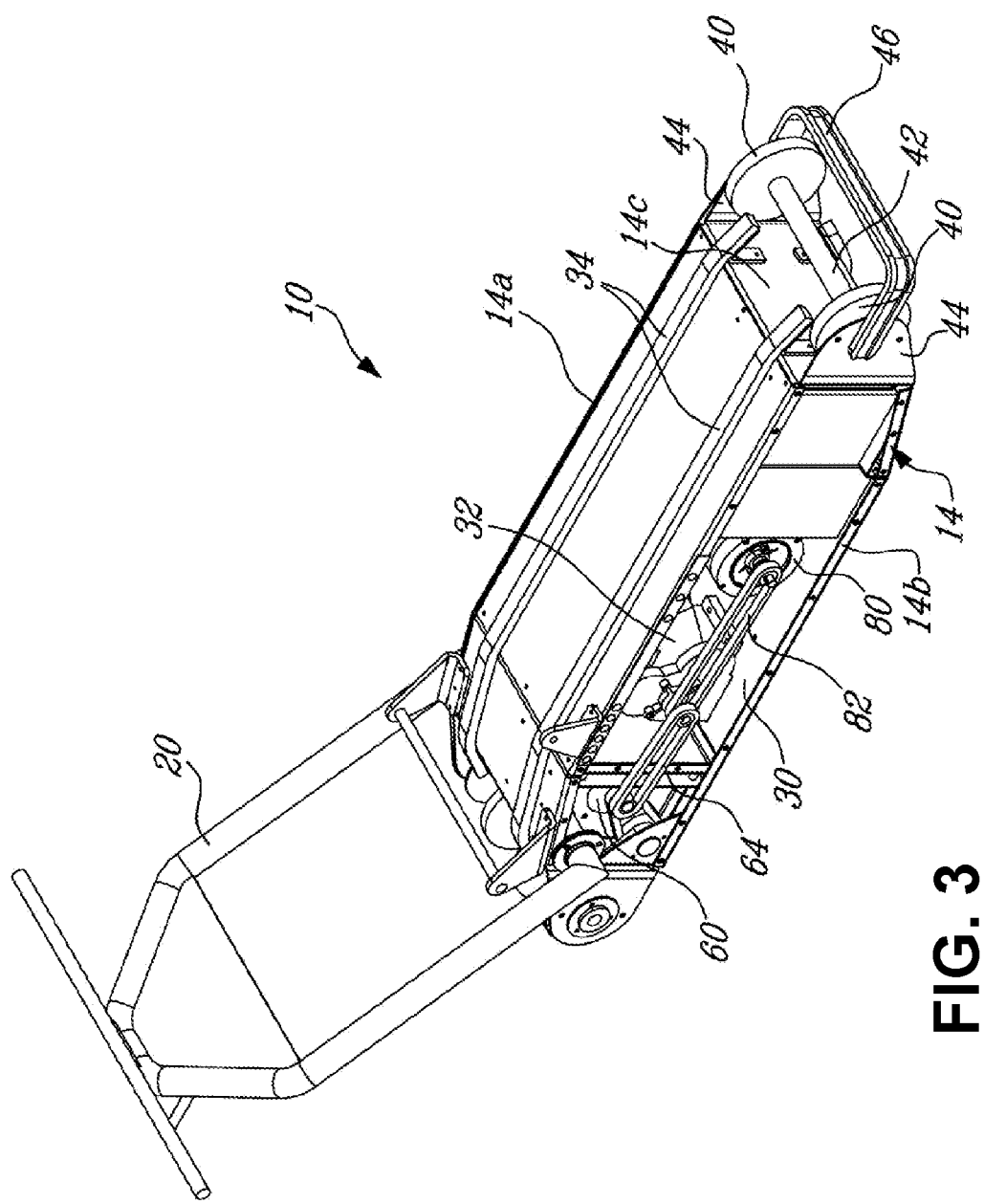
FIG. 3 is a view similar to FIG. 1 but shows the apparatus without its track and without the lateral walls on the sides of its housing.
Figure 4:
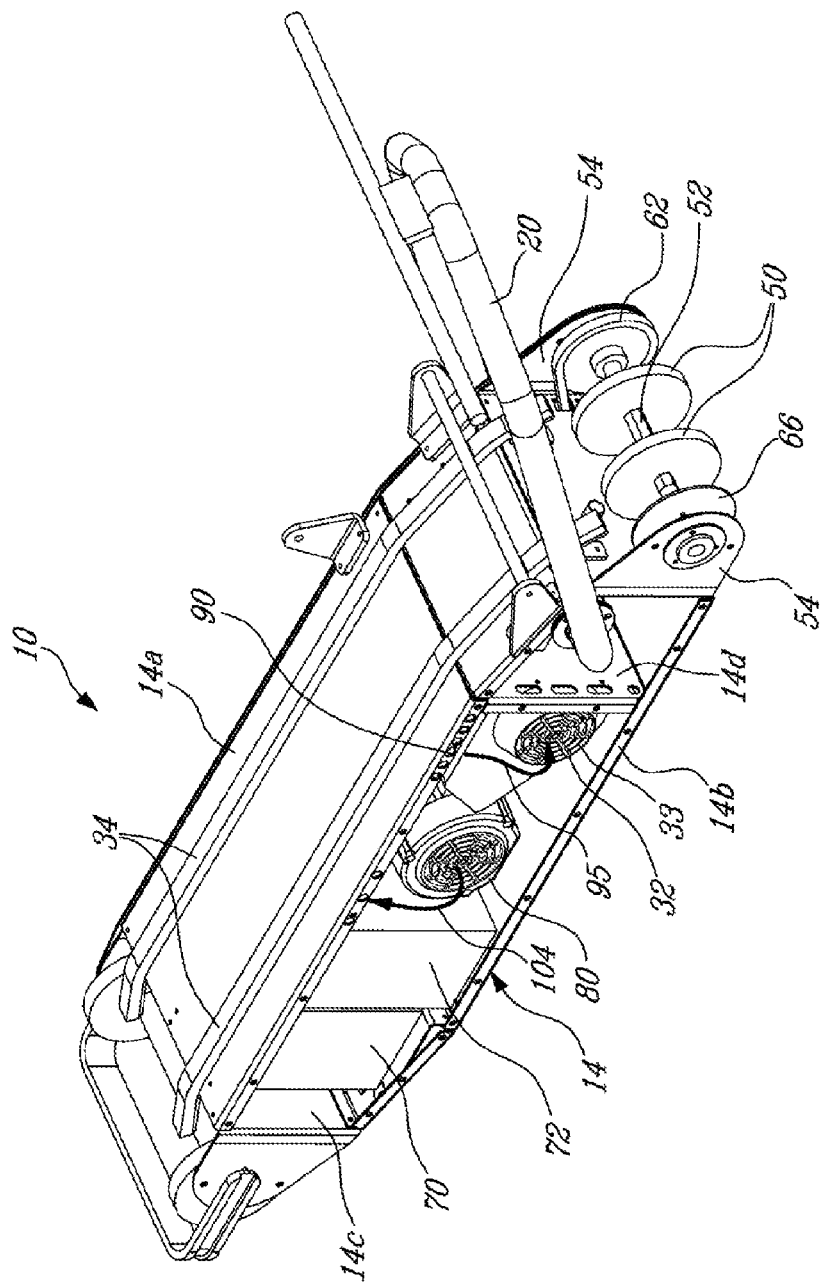
FIG. 4 is a view similar to FIG. 3 but shows the left side of the apparatus, as seen from the rear.
Figure 5:
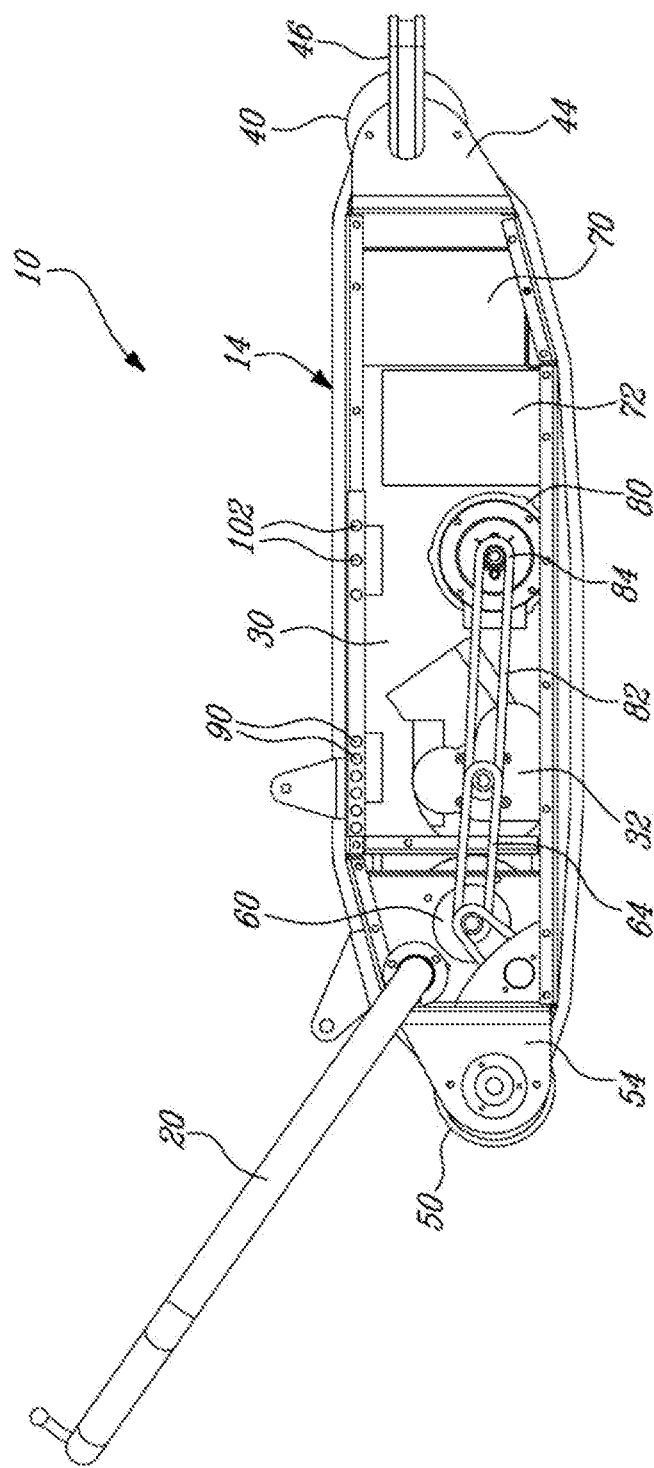
FIG. 5 is a right side view of the apparatus shown in FIG. 3.

FIG. 2 is a side view of the apparatus 10 shown in FIG. 1. FIGS. 1 and 2 show the assembled apparatus 10. FIG. 3 is a view similar to FIG. 1 but shows the apparatus without its track 12 and without the lateral walls 16 on the sides of its housing 14. FIG. 4 is a view similar to FIG. 3 but shows the left side of the apparatus 10, as seen from the rear. FIG. 5 is a right side view of the apparatus 10 shown in FIG. 3.

As can be seen, especially in FIGS. 3 and 4, the housing 14 defines an inner chamber 30 in which different components of the apparatus 10 are located, such as its internal-combustion engine 32. The housing 14 also includes a top wall 14a, a bottom wall 14b, a front wall 14c and a rear wall 14d. The housing 14 has a reinforced structure which can include one or several internal walls to divide the inner chamber 30. The compartments communicate with each other.

A pair of top skids 34 is disposed longitudinally on the top wall 14a of the housing 14. A pair of bottom skids, similar to those on the top wall 14a, is disposed longitudinally on the bottom wall 14b of the housing 14. The skids are made of a material having a very low friction coefficient. They allow, among other things, the track 12 to rotate around the housing 14 and to reduce friction between the inner face of the track 12 and the exterior of the housing 14. They also serve as guides to keep the track 12 in registry with the axis of the apparatus 10. The skids extend for several centimeters beyond the front and rear ends of the top wall 14a and of the bottom wall 14b so as to support the track 12 along almost the entire length of the apparatus 10. Variants are possible.

At least one front roller is rotatably connected on the front of the housing 14. In the illustrated example, two front rollers 40 are provided. The front rollers 40 are coaxially mounted around a front transversal axle 42 which is supported by an internally-greased axle connected at its ends to two opposite plates 44 which are disposed parallel to the longitudinal axis of the apparatus 10. The plates 44 are rigidly connected to the front of the housing 14. Also in the illustrated example, a bumper 46 is provided at the front of the apparatus 10. The ends of the bumper 46 are connected to the two plates 44, as shown for instance in FIGS. 3 and 4. Sufficient clearance is provided between the interior of the bumper 46 and the front rollers 40 to allow the track to rotate around the housing 14 without interfering with the interior of the bumper 46. Variants are also possible.

At least one rear roller is rotatably connected at the rear of the housing 14. In the illustrated example, two rear rollers 50 are provided. The rear rollers 50 are coaxially mounted around a rear transversal axle 52, which is supported at its ends by bearings located in two opposite plates 54 disposed parallel to the longitudinal axis of the apparatus 10. The plates 54 are rigidly connected to the rear of the housing 14. Also in the illustrated example, a mechanical connection is provided between the output shaft of a transmission 60 located within the housing 14 and the rear transversal axle 52. The rear rollers 50 are thus used to drive the track 12 in rotation so as to move the apparatus 10. Different types of mechanical connections can be used between the transmission 60 and the rear transversal axle 52. The illustrated one includes a drive belt 62 or a chain and provides a reduction of the rotation speed between the output shaft of the transmission 60 and the rear transversal axle 52. Other types of connections and configurations are also possible. The mechanical connection between the engine 32 and the transmission 60 is provided by a drive belt 64. The transmission 60 can enable either a forward or reverse motion, for instance. It can have one or more speeds or be a variable speed transmission. Numerous other variants are possible.

The rear transversal axle 52 also carries a brake disk 66, which is shown in FIG. 4. The disk is disposed near the left end in the example. The brake pads are attached to the housing 14 and can be operated by the operator 22 from the handlebar 20.

The engine 32 for the track 12 of the example illustrated in FIGS. 1 to 4 is an internal-combustion engine and is located immediately in front of the transmission 60. An intermediary transversal wall is present in the illustrated example so as to reinforce the area between the internal-combustion engine 32 and the transmission 60. The internal-combustion engine 32 is supplied with fuel from a tank 70 located at the front of the inner chamber 30 of the apparatus 10. A battery 72 is disposed beside the fuel tank. This battery 72 is, among other things, provided to power the electric starter of the internal-combustion engine 32. The operator 22 is thus able to start or to stop the engine 32 without having to access it directly. Variants are also possible.

The apparatus 10 shown in FIGS. 1 to 5 also includes a generator 80 provided in the inner chamber 30 and that can produce electricity intended to power one or more external equipment at a voltage corresponding for instance to that of a domestic electrical outlet, for example 110 V or 220 V/240 V at 60 Hz or also at 50 Hz. One or more electrical sockets are available on the apparatus 10 or on the generator 80 itself. The generator 80 includes an internal rotor which can be rotatably driven by the same internal-combustion engine 32. The possibility of generating electricity within the apparatus 10 can be very advantageous to users such as workers operating power tools at remote sites, or to owners of cottages located far from inhabited areas. Many other uses can be devised. A generator with a power rating of 4000 to 6000 W can be provided within an apparatus 10 of the size shown in FIGS. 1 to 5. Using a smaller or even a larger generator is also possible.

The axis of the generator 80 is disposed transversely with reference to the longitudinal axis of the apparatus 10 in the example. The generator 80 could also be disposed in some other way in certain models, for instance using an angular gearbox. It is connected to the output shaft of the internal-combustion engine 32 by a drivebelt 82. An electric clutch 84, provided on the shaft of the generator 80, allows the mechanical connection between the generator 80 and the internal-combustion engine 32 to be engaged or disengaged remotely. Thus, when there is no need for the generator 80 to be used, for instance when the apparatus 10 is in motion, unnecessary rotation of the rotor of the generator 80 can be avoided. When the generator 80 is in operation, the transmission 60 of the apparatus 10 is set to neutral. Variants are also possible.

The admission of fresh air into the interior of the inner chamber 30 of the housing 14 is effected through a series of apertures 90 provided on at least one lateral side of the housing 14, immediately beneath the top wall 14a. These apertures 90 have a relatively small diameter so as to minimize snow and debris ingestion, such as twigs or others. Air passing through the apertures 90 goes into an inlet box which collects the air coming from all the apertures 90 on each side of the housing 14. When the apparatus 10 is in use, the inlet box is heated from below by the heat released from the internal-combustion engine 32 and which circulates in the inner chamber 30. This heat allows the inner chamber 30 to be kept well above freezing point (0° C.) even if the outside temperature is very cold, for example below −20° C. With this heat, any snow particle entering the inlet box can melt and drip out toward the exterior, even during cold weather. The air exits the inlet box through an exit pipe which is circular in the example. The top of the exit pipe can be raised several millimeters above the bottom of the inlet box so as to prevent the flow of water directly toward the inner chamber 30.

The apparatus 10 includes an air inlet box. Air leaving the inlet box is then channeled into a flexible duct 95 (schematically illustrated in FIG. 4) leading to the inlet 33 of the cooling fan shroud located on the internal-combustion engine 32. The fan in the engine 32 thus generates the necessary suction force to draw air through the apertures 90. The cooling air passes around the cylinder or cylinders of the internal-combustion engine 32 and ends up in the interior of the inner chamber 30.

Variants of what is described in the preceding paragraphs are possible.

The evacuation of air from the interior of the apparatus 10 is effected in two ways. On the one hand, the combustion of fuel in the engine 32 generates exhaust gases. The air used in this combustion process is admitted into the interior of the engine 32 from the interior of the inner chamber 30 or it can also come directly from the inlet box for some engines. The exhaust gases coming out of the cylinder or cylinders of the engine 32 are then directed toward the rear of the apparatus 10 using an exhaust pipe. The exit of the exhaust pipe is located in a space where the rear transversal axle 52 and the two rear rollers 50 are located. This space is partially blocked by the presence of the track 12 when the apparatus 10 is assembled. This configuration, among other things, reduces noise as well as prevents any possible contact between the skin or cloths of the operator 22 and the hot exit of the exhaust pipe. Other configurations are also possible.

Some air is also evacuated from the interior of the inner chamber 30 through an air outlet which forms part of the ventilation circuit. Air passing through the outlet goes first into the cooling circuit of the generator 80 and then flows through a flexible duct 104 (shown schematically in FIG. 4) up to the inlet of an air outlet box. The outlet box has a similar structure to that of the inlet box. The air is then evacuated through the apertures 102 located on at least one lateral side of the housing 14. Variants are also possible.

When the generator 80 is in operation, the fan integrated into the generator 80 contributes to the displacement of air so as to increase the air flow that cools it. Additional fans disposed in series on the flexible ducts connected to the air inlet and to the air outlet can further increase the air flow if the temperature inside the inner chamber 30 becomes too high. These fans can be automatically switched on using a thermostat provided with a temperature sensor or another arrangement.

The apparatus 10 is configured in such a way that a positive pressure is created in the inner chamber 30. This is achieved by providing an overall air inlet area greater than the overall air outlet area. In the example, the number of apertures 90 is greater than the number of apertures 102. The positive pressure, among other things, improves the watertightness of the housing 14.

When the apparatus 10 is in motion, the sides of the housing 14 are closed in a watertight manner using the lateral walls 16 that are shown in FIGS. 1 and 2. These lateral walls 16 are bolted or are otherwise attached to the rest of the housing 14. The interior of the housing 14 thus remains watertight and dry while the apparatus 10 is in use.

As is shown in FIG. 5, the underside of the housing 14 is convex at its center. This heightening is about 3 cm at the front and at the rear of the track 12 in the apparatus 10 of the illustrated example. This central part corresponds to about one third of the length of the apparatus 10. The heightening, among other things, facilitates a yawing motion when making a turn as well as the manual pivoting of the apparatus 10 on hard and rough surfaces, for example on asphalt or concrete. Moreover, the front of the bottom wall 14b defines an angle with reference to the horizontal. The front transversal axle 42 is thus higher than the rear transversal axle 52. This also facilitates passage over obstacles. Variants are also possible.

FIG. 6 is a view similar to FIG. 1 but where the operator 22 is standing on a sled 200 hitched to the apparatus 10. The hitch 202 of the sled 200 is connected to a support 210 which, in the illustrated example, is in the form of a transversal strut that is straight or slightly curved towards the rear at its center. The transversal strut 210 is supported using two corresponding plates 212 projecting towards the top of the housing 14. The hitch 202 includes two retainer arms of the sled 200, which arms are attached to a plate 204 that can pivot around a vertical axis where it joins a fastening element 206. The fastening element 206 can slide left and right along the transversal strut 210 using two pulleys provided on either side of the fastening element 206. In a turn, the fastening member 206 can thus move toward one of the ends of the transversal strut 210, this facilitating handling of the apparatus 10 and reducing the effort required from the operator 22. Variants are also possible.

Figure 7:
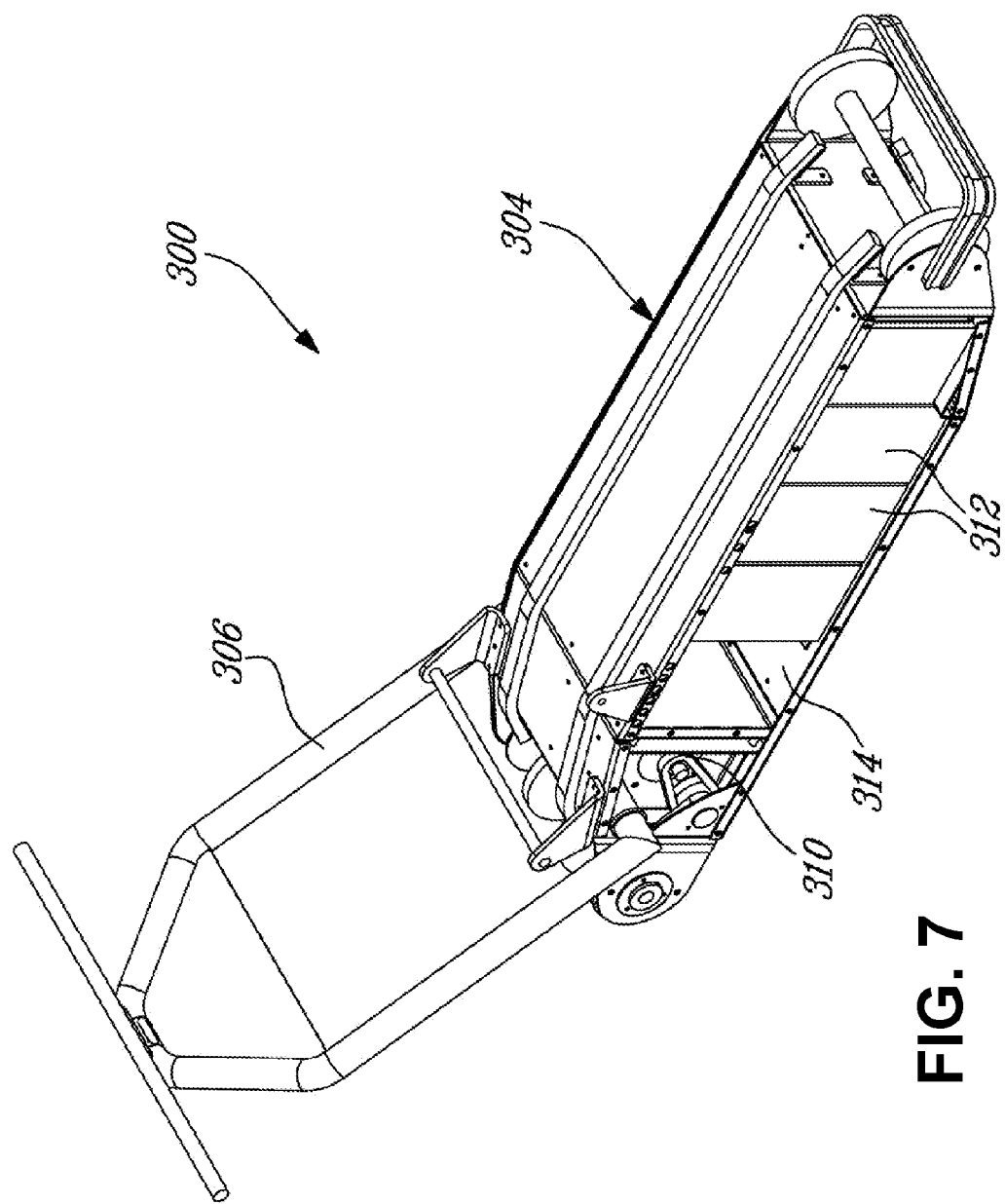
FIG. 7 is a view similar to FIG. 3 but shows a second example of an apparatus based on the proposed concept in WO 2011/127607, this example using an electric motor.
Figure 8:
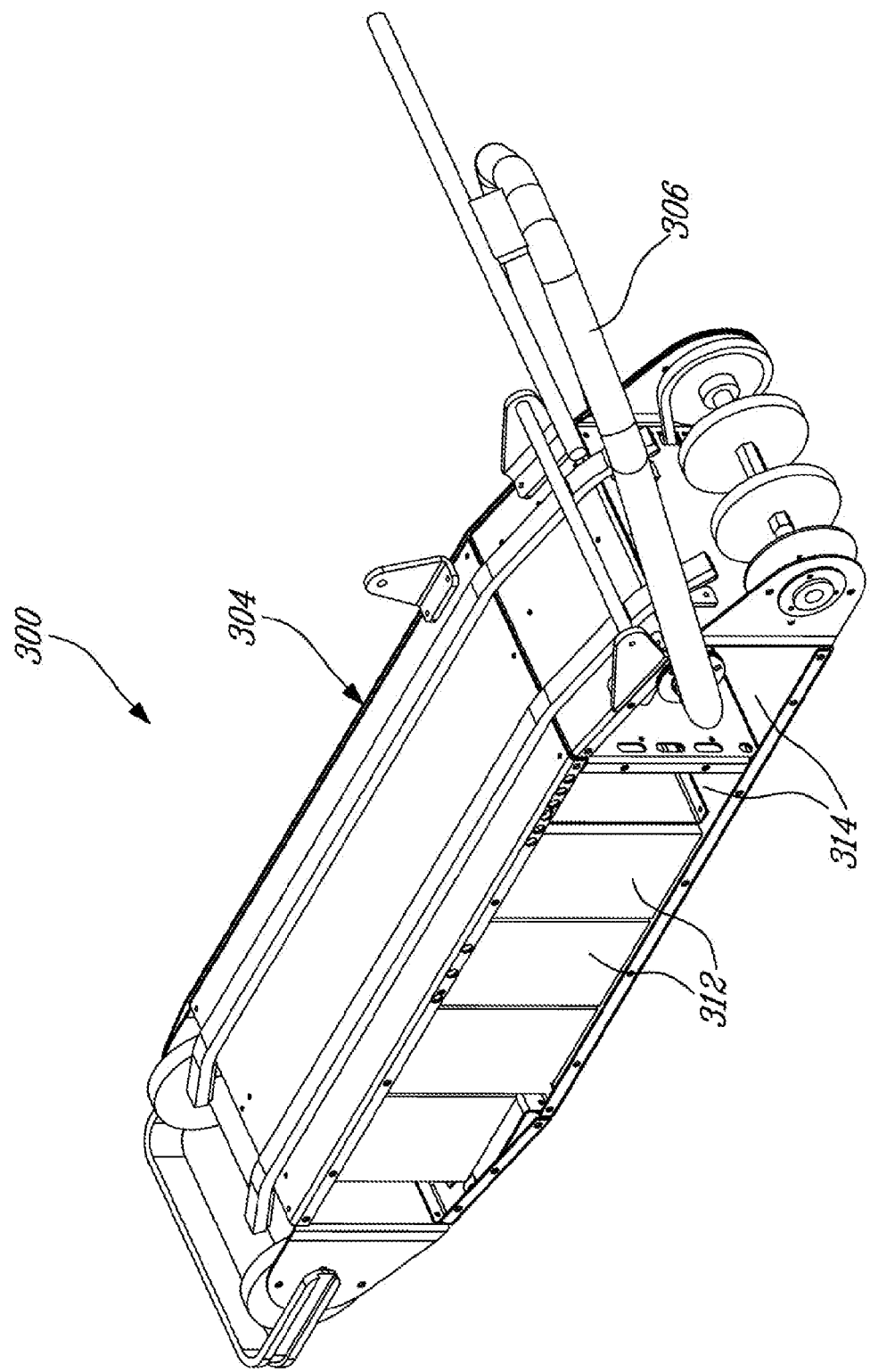
FIG. 8 is a view similar to FIG. 7 but shows the left side of the apparatus, as seen from the rear.
Figure 9:
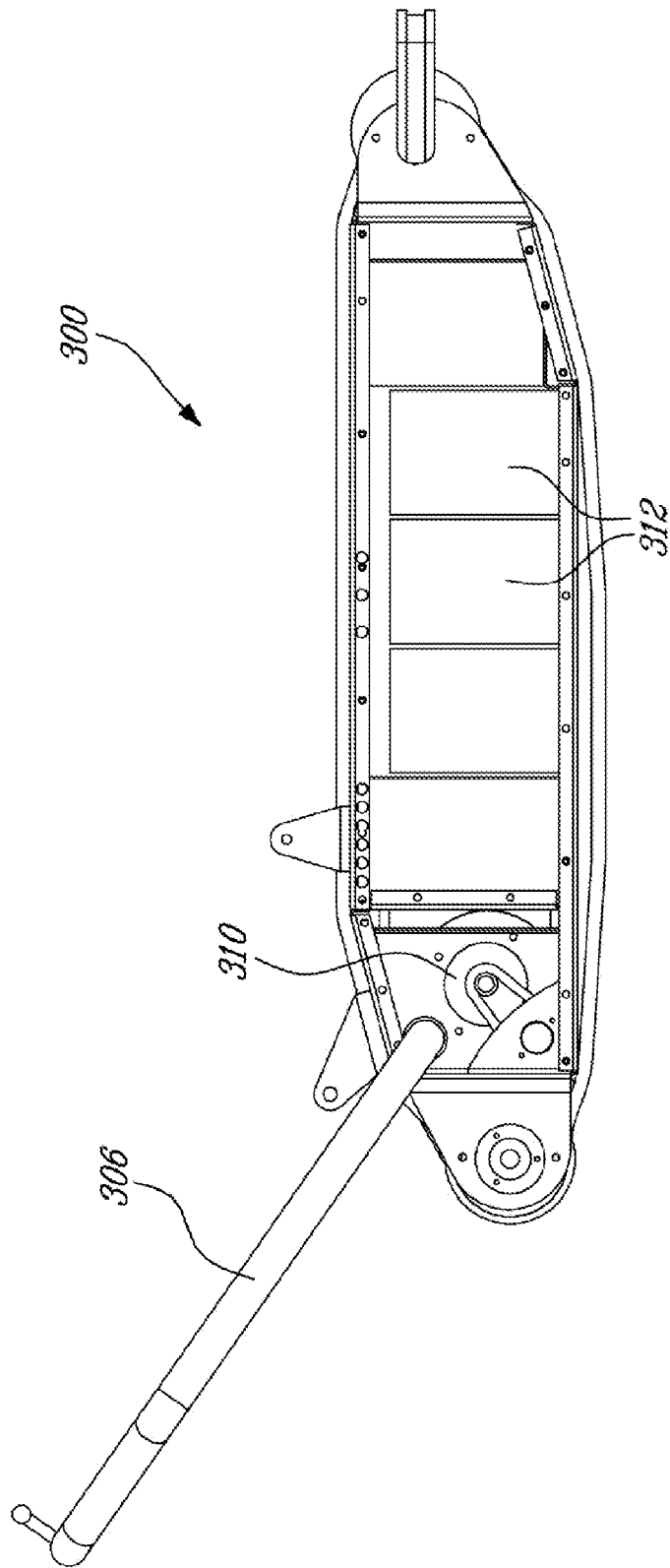
FIG. 9 is a right side view of the apparatus shown in FIG. 7.

FIGS. 7 to 9 show a second example of an apparatus 300 in which an electric motor is used. This apparatus 300 is otherwise similar to the apparatus 10 shown in the previous example. The apparatus 300 includes, among other things, a track 302, a watertight housing 304 and a handlebar 306, which handlebar is held by an operator 308. The apparatus 300 can also be used with the sled 200 in FIG. 6.

The track 302 of the apparatus 300 is rotatably driven by an electric motor 310. This motor 310 is powered using electricity from one or several batteries 312, which are also located within the inner chamber 314 of the housing 304. The electric motor 310 can either be of type AC or DC, with or without permanent magnets. A group of four deep cycle lead batteries 312 is shown in the illustrated example. The number and the type of batteries 312 can differ according to requirements. The batteries 312 are connected to an electric controller which the operator 308 controls from the handles of the handlebar 306. The various electrical connections are not shown in the figures so as to simplify the illustrations.

In use, the electric motor 310 releases heat. This heat often accounts for about 10% of the electrical energy drawn from the batteries 312. The heat thus dissipated is used within the inner chamber 314 of the apparatus 300 to keep the batteries 312 warm when the outside temperature is very cold. This heat thus makes it possible to keep the batteries at an optimal temperature despite very cold weather. The optimal temperature can be for instance in the range of 20 to 25° C. Other temperatures are also possible. This heat recovery is beneficial because most batteries lose their efficiency in cold weather. This is particularly the case of lead batteries. Although other batteries with better performance exist, lead batteries remain an attractive choice because they are easily available and relatively inexpensive. They withstand cold weather better than nickel or lithium batteries for instance. However, the efficiency of lead batteries diminishes almost linearly with reference to temperature, going for example from 100% at 25° C. down to 30% at −40° C., depending on the exact type of battery. The decrease in efficiency thus has a direct impact on the autonomy of the apparatus 300. By keeping the heat inside the housing 304 during cold weather, the batteries 312 can then maintain a much higher efficiency than that at low temperatures. The interior of the housing 304 can also be insulated to help conserve heat. Variants are also possible.

An internal ventilation circuit is provided in case of overheating, for example when the apparatus 300 is operating in relatively mild weather and the electric motor 310 is intensively solicited. This internal ventilation circuit is part of the ventilation circuit. It can include a thermostat which activates at least one fan providing a supply of air from the outside to dissipate interior heat. The air inlet and the air outlet can be located in the top part of the handlebar 306 at a certain distance from one another. The air then circulates in the tubes forming the sides of the handlebar 306. The fan or fans can be provided in the housing 304 or alternatively in the handlebar 306. The junction between the handlebar 306 and the housing 304 is configured so as to provide an air passage between them. This way, the housing 304 can have a very watertight structure up to the height of the air inlet and the air outlet on the handlebar 306. A positive pressure is maintained within the interior of the inner chamber 314 to mitigate the risks of having water infiltration at locations which may not be completely watertight. The apparatus 300 can then even be immersed in water from time or time, as might be required for instance when the apparatus 300 must cross an unfrozen stream or a similar body of water.

It is possible to provide a heating element, for instance a heating cable, inside the housing 304 to keep the batteries 312 warm when they are being charged outdoors during cold weather and also while they are being stored outdoors.

Figure 10:
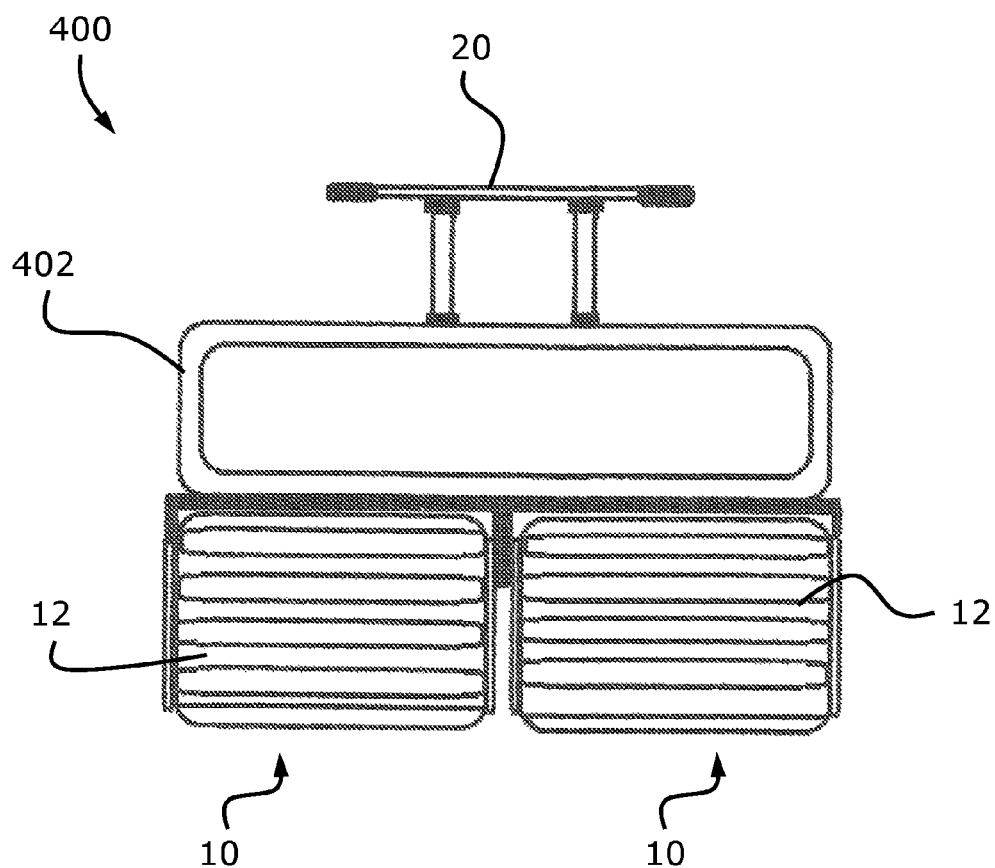
FIG. 10 is a semi-schematic front view showing an example of a compact drive unit in accordance with the proposed concept.

FIG. 10 is a semi-schematic front view showing an example of a compact drive unit 400 in accordance with the proposed concept. The drive unit 400 includes two compact pulling apparatuses 10 as a base and also to provide the motorized arrangement. The two apparatuses 10 of the drive unit 400 are juxtaposed and rigidly paired. The housings of these apparatuses 10 are thus part of the frame of the drive unit 400.

In FIG. 10, each of the apparatuses 10 includes an internal-combustion engine therein. Their configuration could be, for instance, similar to that shown in the example of FIGS. 3 to 5. Numerous variants are however possible. It could even be possible to use more than two juxtaposed apparatuses 10. It must be understood that the reference to the presence of two apparatuses 10 can include the case where there are more than two apparatuses 10.

In the example illustrated in FIG. 10, each apparatus 10 includes, among other things, a watertight housing, a track 12 disposed around the housing along its longitudinal axis, a driving motor for the track 12 and a ventilation circuit for the inner chamber of the housing. The two tracks 12 are then in juxtaposition and at a close distance from one another. Yet, this configuration allows positioning the tracks 12 at a distance of 3 inches (76 mm) or less between their corresponding inner edges. It is still possible to position the tracks 12 at a greater distance. However, it was found that a distance of 3 inches (76 mm) or less is very advantageous to reduce the likelihood or even completely avoid introducing debris, such as rocks or others, into the intervening space. Such debris could otherwise block the drive unit 400 and require an intervention from the operator. The tracks 12 can be positioned at a very small distance from one another, this distance being even possibly less than 1 mm in some embodiments so as to optimize the ground bearing and reduce the likelihood of getting bogged down on soft grounds. The minimum distance to be maintained will often depend on the amplitude of the lateral displacement of the tracks 12 in use. Even in normal use, the tracks 12 may move slightly off their longitudinal axis, especially for example in tight turns. Other similar situations also exist.

FIG. 10 also illustrates the fact that the drive unit 400 can be configured for receiving a transport rack 402 or any similar structure of the same nature that can be positioned above the tracks 12. This transport rack 402 can be useful for carrying equipment or materials, to name just these two examples. The drive unit 400 then acts as a payload transport vehicle. The loading capacity of the drive unit 400 is significantly increased by the fact that two apparatuses 10 are paired. The operator can control the drive unit 400 in various ways, for example with the handlebar 20. The handlebar 20 may be shifted laterally to create a moment of force urging the drive unit 400 to turn.

Some embodiments may include controls at the level of the handlebar 20. It could also be possible to place the controls elsewhere than on the handlebar 20. The steering controls can be provided to steer the drive unit 400 using mechanical force coming from the drive unit itself. For example, the rotation speed of one of the tracks 12 around its housing could be different from the rotation speed of the other track 12. It may even be possible to stop the rotation of one of the tracks 12 while the other track 12 is in motion. Another possibility is to reverse the direction of rotation between the two tracks 12. This asymmetry in the motion of the tracks 12 will then create a moment of force to change the direction of the drive unit 400.

To achieve control of the rotation of the tracks 12 independently from one another, it is possible to use a motor for each of the tracks 12. A further possibility is the use of a differential which, when provided together with an independent braking system on each side of the drive unit 400, including a disk or others, can create a rotation speed difference between the two tracks 12. For example, in this case, it can be possible to brake the track 12 on the left so as to increase the power transferred to the track 12 on the right and thereby cause the drive unit 400 to pivot to the left. To turn right, one only needs to execute the opposite action, thus braking the right side. Other possibilities also exist. For example, using an electrical or electronic control is possible. One example of electrical control is a pair of potentiometers, each placed on one of the handles of the handlebar 20 in order to measure the position of corresponding levers actuated by the operator. An example of an electronic control is a lever similar to a "joy stick", which allows a control without physical effort and with a high accuracy. One can find such arrangement on motorized wheelchairs. The use of a control in the form of a steering wheel or a pivoting handlebar, like as the one on a motorcycle for instance, is possible. Many more variants can be considered.

Figure 11:
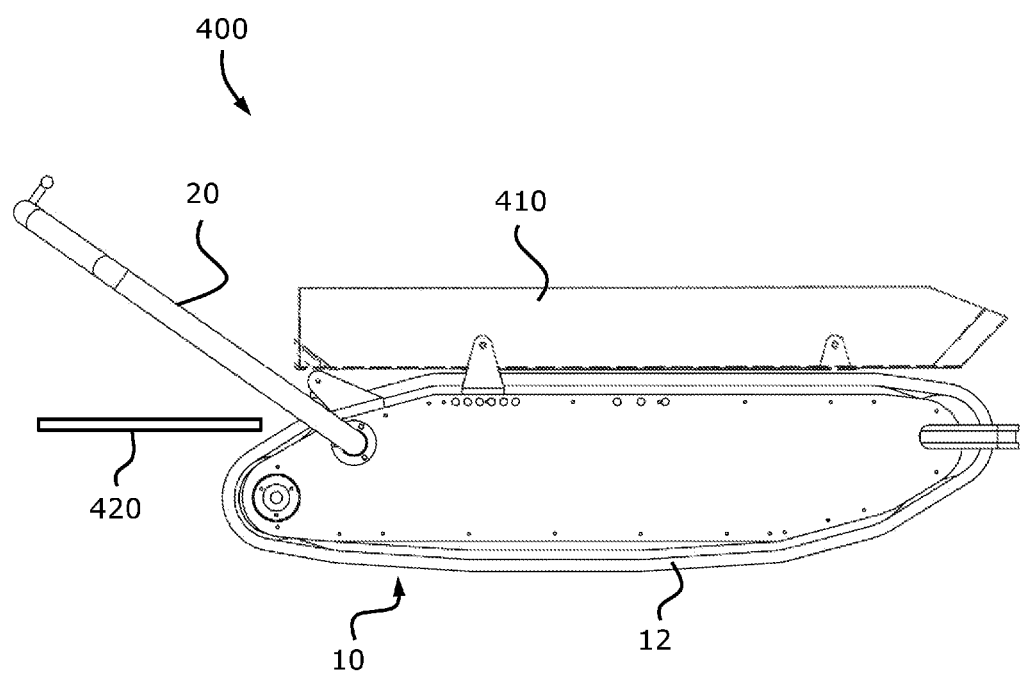
FIG. 11 is a semi-schematic side view showing another example of a compact drive unit in accordance with the proposed concept, this unit including a dump body.

FIG. 11 is a semi-schematic side view showing another example of a drive unit 400 according to the proposed concept. This figure illustrates a drive unit 400 provided with a dump body 410 placed above. This dump body 410 has a width that is equivalent to the width of the drive unit 400. Other configurations are also possible. Adding a dump body 410 to the drive unit 400 then transforms it into the dumper. Such dumper can be used to transport bulk materials, for instance earth, sand, gravel, wood, or any other materials or cargo, to places that are otherwise difficult to access using any other kind of vehicle. The low height of the dump body 410 from the ground keeps the center of gravity extremely low, which substantially increases the stability of the drive unit 400 on a rugged terrain and particularly in slopes. The height of the center of gravity is also very low since the entire motorized arrangement and the heavier components are in the housing, thus very close to the ground. The low height of the dump body also reduces the effort required for loading materials, which is a very important advantage to facilitate the work to be done during loading. This advantage is also present when using a fixed transport rack 402 (FIG. 10) instead of one with a dump body 410.

FIG. 11 also schematically illustrates a platform 420 on which the operator can stand when the drive unit 400 travels, thus preventing the operator from having to walk behind the drive unit 400. The exact location and the precise shape of the platform 420 are conceived so that the operator can easily get on and get off it. The platform 420 may be omitted in some configurations but remains interesting since the drive unit 400 will often be used on difficult terrains, for instance on snow-covered terrains and/or on rough terrains and/or on muddy terrains, thus where walking could be difficult. An example of a rough terrain is one with a large number of rocks, tree trunks, holes in the ground, etc. Other situations also exist. In the context of the present case, a terrain covered with a relatively thick layer of sand is the equivalent of a snow-covered terrain if the sand is dry, or is the equivalent of a muddy terrain if the sand is damp, wet or covered with water.

Alternatively, the drive unit 400 could be used by an operator wearing skis, as shown in FIG. 1, or by an operator standing in a sled, as shown in FIG. 6. It should be noted that depending on where the drive unit 400 will be used, the sled can include one or more wheels, thus be a trailer. The sled could also be fitted with skis. Many other variants are possible.

Figure 12:
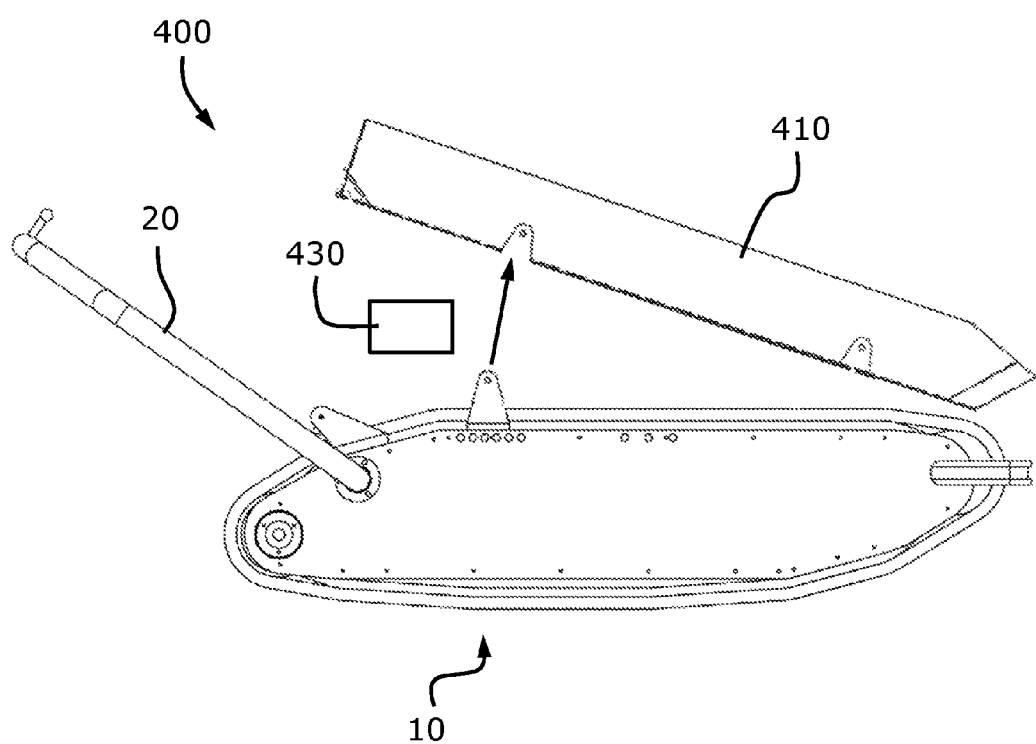
FIG. 12 is a view similar to FIG. 11 in which the dump body is shown in a tilted position.

FIG. 12 is a view similar to FIG. 11 in which the dump body 410 is illustrated in a tilted position. This tilting can be motorized or not. For example, in the case of a motorized tilting, the drive unit 400 can include a hydraulic system, a pneumatic system or another system that can be selectively operated by the operator to change the angle of the dump body 410 and thus be able to easily lay the materials at the desired location. This system, built-in on the drive unit 400, is schematically depicted by element 430. Some configurations, however, may not require a motorized tilting arrangement and may require instead an entirely-manual action by the operator. In such a case, one or more springs could be used to compensate the weight of the dump body. Other variants are also possible.

It should be noted that in FIG. 12, the pivots and the other fasteners for the dump body 410 are not shown.

FIGS. 13 to 21 are top schematic views illustrating different examples of configurations of the compact drive unit.

Figure 13:
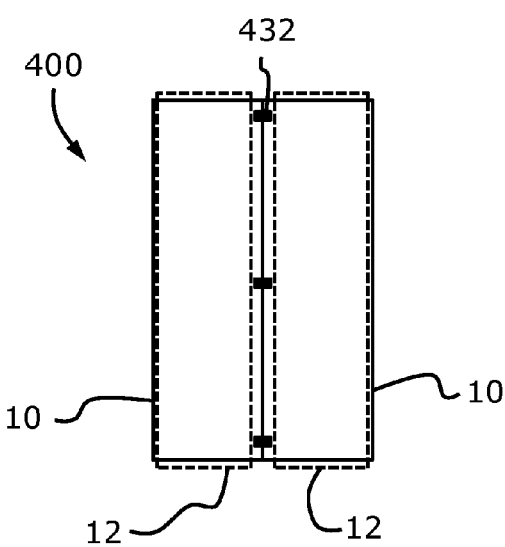

In FIG. 13, the two juxtaposed apparatuses are directly coupled to one another. As aforesaid, the two juxtaposed apparatuses 10 in FIG. 10 are rigidly paired, namely that they are completely made integral with one another. There is thus, for instance, no pivoting between them. They can be bolted directly to one another, for instance using bolts 432 or other fasteners, or be otherwise interconnected using one or more connection elements.

Figure 14:
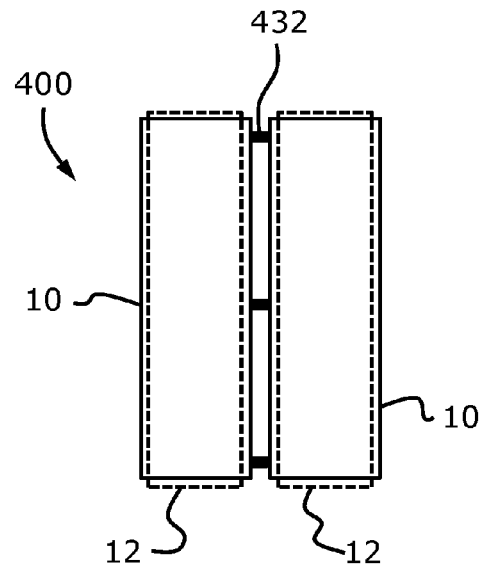

In FIG. 14, the two apparatuses 10 are slightly spaced apart and are attached using connectors 432. FIGS. 13 and 14 also show the relative position of the tracks 12.

Figure 15:
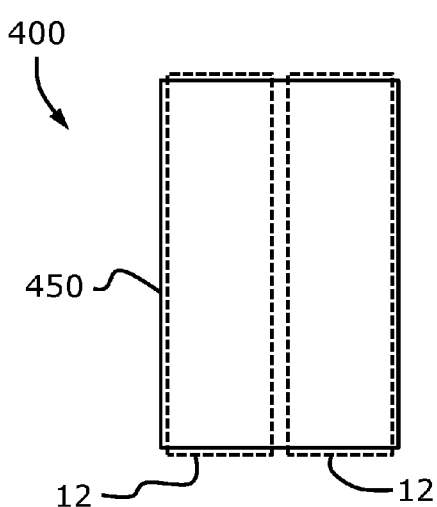

FIG. 15 shows another possible embodiment. It is a drive unit 400 in which the motor arrangement is located inside a single housing 450. However, the drive unit 400 still has the configuration in which the two tracks 12 are juxtaposed and thus parallel to one another. The advantage of having a single housing 450 is the larger space it provides. The configuration with two juxtaposed apparatuses 10 is still very interesting since it allows, when apparatuses 10 are already built in a single-track version, using at least some existing parts. The additional walls and partitions of a version with two juxtaposed and paired apparatuses 10 will also provide a greater strength and rigidity to the drive unit 400.

In the case of two juxtaposed apparatuses 10, the two apparatuses 10 can be similar or be of different nature, depending on the needs. For instance, FIG. 16 schematic shows two apparatuses 10, each having an electric motor 310 and a plurality of batteries 312. The batteries 312 provide power to the corresponding motor 310. It is however possible to provide interconnections between the batteries 312 on each side.

Figure 17:
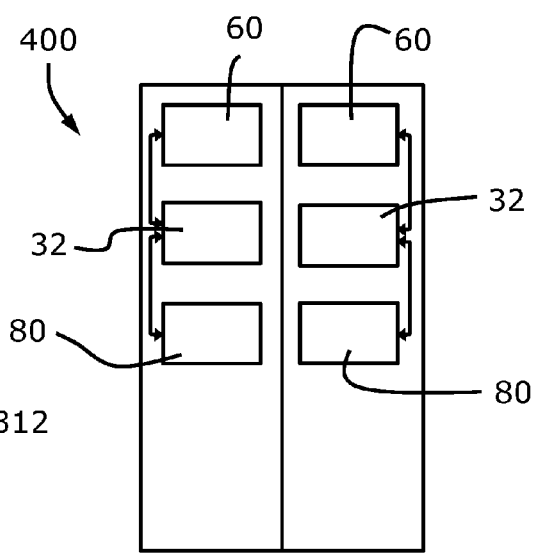

FIG. 17 schematically shows two apparatuses 10 provided with internal-combustion engines 32. Each internal-combustion engine 32 is connected to a corresponding transmission 60. Still, in this example, each internal-combustion engine 32 can also drive a corresponding generator 80. This configuration creates a dumper said to be a "generator" when the drive unit 400 is provided with a dump body as in FIGS. 11 and 12. The generator 80 could be omitted in one or the two apparatuses 10, depending on the needs.

A configuration as shown in FIG. 17 can require changing the internal layout of some elements in one of the two apparatuses 10 when the design of these models was made for a single track. The elements are then moved for taking into account the fact that the apparatus 10 is located on the left or on the right in the drive unit 400, whichever is applicable. Also, the apertures for the air inlet are preferably on the exterior lateral side. However, the air outlet and also the exhaust of the internal-combustion engines 32 could be shared between the two apparatuses 10, if required. It is possible for instance to provide a shared outlet in the intervening space, thus in-between the housings of the two apparatuses 10. It is also possible to provide an exhaust outlet on the respective lateral side, or even on a single one of the two lateral sides.

Figure 18:
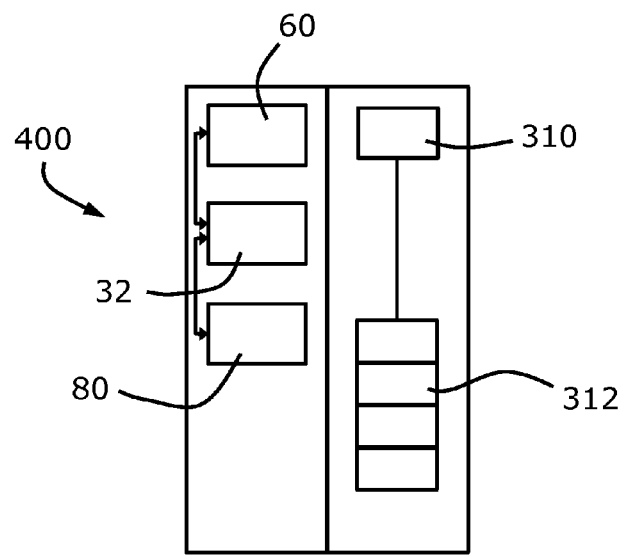

In FIG. 18, one of the apparatuses 10 is provided with an internal-combustion engine 32 with a generator 80, and the other apparatus 10 includes an electric motor 310 and batteries 312.

Figure 16:
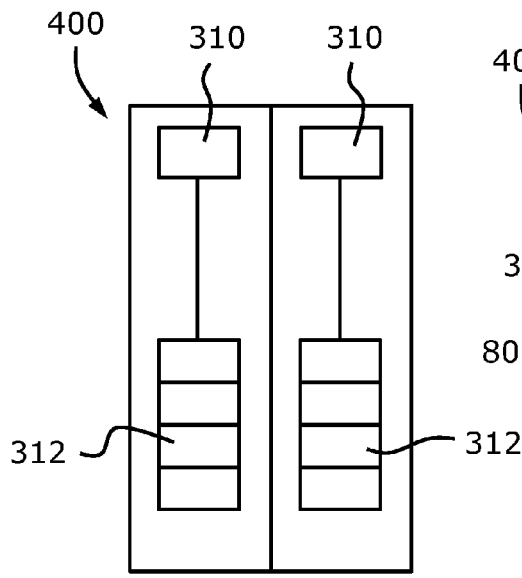

Whether in one or the other of the possible configurations for juxtaposed apparatuses 10, for example those shown in FIGS. 16 to 18, some of the spaces or even all of the spaces within the housings can be interconnected through apertures and/or ducts, so that the pressure be the same between them when a positive pressure is maintained during operation. The ventilation circuit of each apparatus 10 can therefore be shared, each then forming a part of the ventilation circuit of the overall drive unit 400.

In FIG. 19, the drive unit 400 includes a single internal-combustion engine 32, which is connected to a transmission 60 and also, in this example, to a generator 80. The transmission 60 conveys the driving power to each track 12. It can also include a differential so that the rotation speed of the tracks 12 be different. Nevertheless, in some implementations, in particular when the transported weights are relatively small, one can simply use a transmission without a differential. The rotation speed to the tracks 12 would then always be the same. In this case, the operator can steer the drive unit 400 manually, for instance by laterally shifting the handlebar 20.

The configuration that is schematically depicted in FIG. 19 can transport a generator 80 having a relatively large power capacity inside the drive unit 400. The generator 80, as well as all other components, are then well protected and sheltered inside the housing.

FIG. 20 illustrates a single housing 450 that is similar to that of FIG. 19 but where the motors are electric motors 310 powered by the batteries 312. It is also possible to provide only one electric motor 310 in some embodiments. This configuration will create an electric dumper when the drive unit 400 is provided with a dump body 410 as in FIGS. 11 and 12. The housing 450 with the largest volume that is schematically depicted in FIG. 20 allows using larger batteries 312, thus more powerful batteries compared to those of the juxtaposed apparatuses 10. In all cases, it would be possible to provide an electrical power converter, for instance DC to AC, to supply power for a domestic power outlet or others.

FIG. 21 is a schematic view of an embodiment in which are provided altogether an internal-combustion engine 32, a generator 80, two electric motors 310 and two sets of batteries 312. This is thus a model of drive unit 400 said to be "hybrid". In this case, the operator and/or a control system can determine which among the two modes (mechanical or electrical) must be used. It could also be possible to use both simultaneously.

Many other configurations are possible. For instance, it could be possible to have an internal-combustion engine 32 that is only connected to a generator 80, which internal-combustion engine 32 does not directly drive the tracks 12 through a mechanical connection. Power to drive the tracks 12 is then supplied through the electric motors 310.

Figure 22:
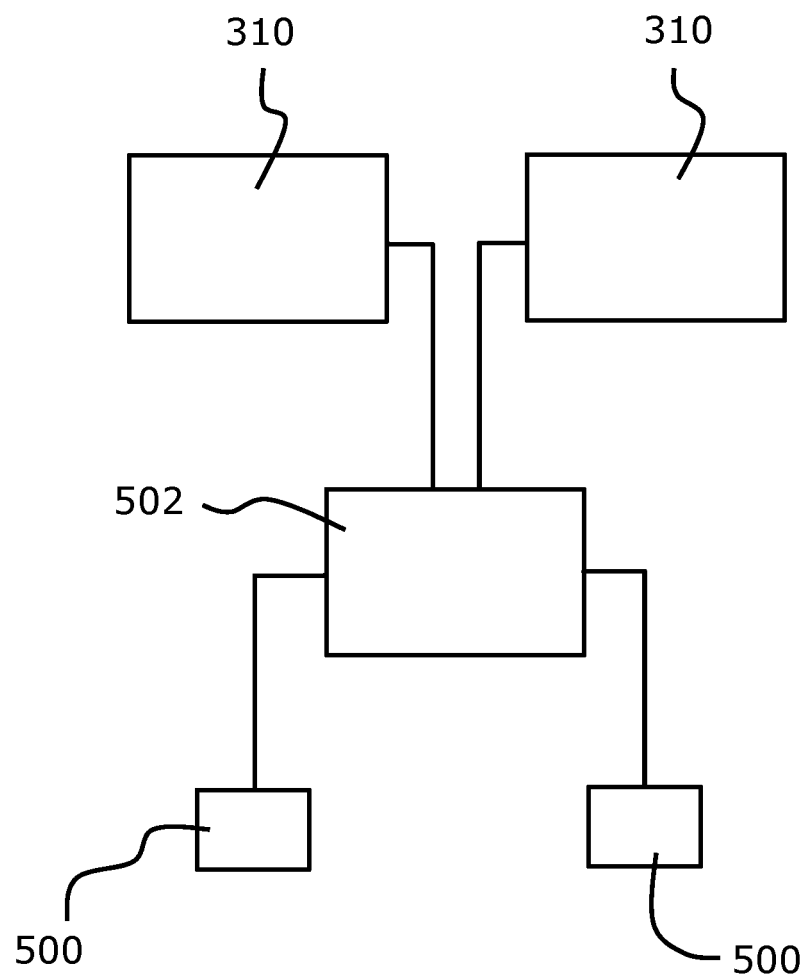
FIG. 22 is a block diagram that schematically shows an example of a control for the drive unit.

FIG. 22 is a block diagram that schematically shows an example of a control arrangement for the drive unit 400. In this example, potentiometers 500 are provided on the handles of the handlebar 20. Each potentiometer 500 measures the position of a corresponding command lever and sends electric signals or something else to the control unit 502, for instance an onboard computer or a dedicated electronic circuit. These signals are computed by the control unit 502 in order to establish the rotation speed of each track 12. The command signals are sent in this example to electric motors 310, each motor 310 corresponding to one of the tracks 12. Many other variants are possible. This also includes having mechanical-type commands between the handles and the command unit. The levers on the handles could then move metallic rods so as to mechanically transmit the position of each lever to another location on the drive unit 400.

Figure 23:
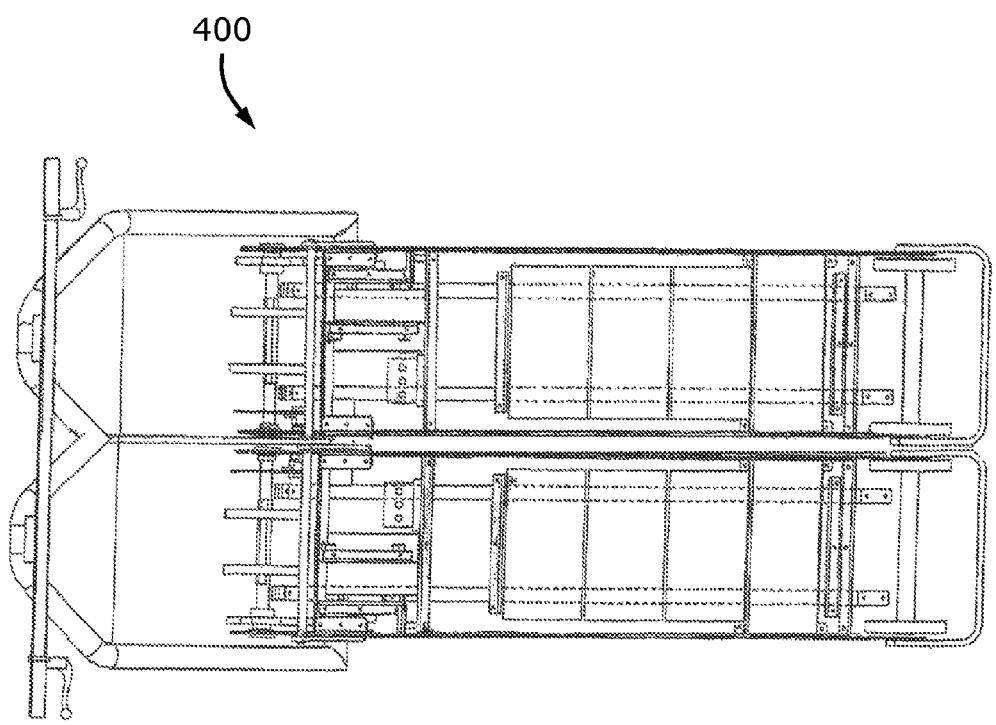
FIG. 23 is a top view of an example of a drive unit in accordance with the proposed concept.

FIG. 23 is a top view of an example of a drive unit 400 according to the proposed concept. This version is substantially similar to that shown in FIG. 16. It includes two juxtaposed apparatuses 10. Each apparatus 10 includes an electric motor 310 and a corresponding set of batteries 312.

Figure 24:
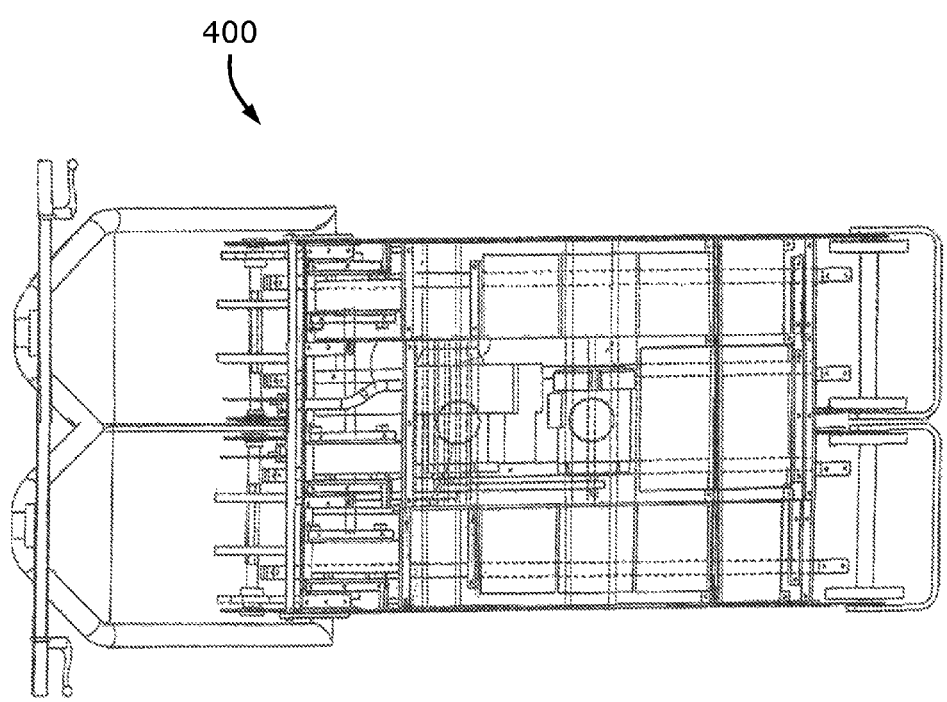
FIG. 24 is a view similar to FIG. 23 and illustrates another example of drive unit in accordance with the proposed concept.

FIG. 24 is a view similar to FIG. 23 and illustrates another example of a drive unit 400 according to the proposed concept. This version is substantially similar to that schematically depicted in FIG. 19. It includes an internal-combustion engine 32, a generator 80 and a transmission 60. The various components are disposed to balance the weight in an optimized fashion. For instance, the internal-combustion engine 32 and the generator 80 are positioned along the central axis of the drive unit 400.

The proposed concept thus allows manufacturing drive units 400 that are very compact, highly performant and that provide an optimum ground bearing while keeping dimensions small in order to reach places very restricted in terms of space. Unlike previously-proposed apparatuses, the tracks 12 can easily cover almost the entire surface that is directly underneath the drive unit 400 and can bring the height of the center of gravity to a minimum never seen before. Very heavy payloads can thus be easily transported to places where it was almost impossible to go before.

The present detailed description and appended figures are only examples. A person working in this field will be able to see that variants can be made while still staying within the framework of the proposed concept.

What is claimed is:

1. A transport drive unit, including:
    a watertight elongated housing extending along a longitudinal axis and defining an inner chamber, the housing including a top wall and a bottom wall;
    two juxtaposed tracks, disposed in parallel around the housing along the longitudinal axis, allowing the drive unit to move when the tracks are driven in rotation around the housing;
    at least one track-driving motor, the motor being located in the inner chamber of the housing and including an output shaft that is mechanically connected to at least one of the tracks;
    a ventilation circuit for the inner chamber of the housing, the ventilation circuit including an air inlet and an air outlet which communicate with outside of the housing, the ventilation circuit allowing the interior of the inner chamber to be kept above the freezing point when the outside temperature is lower and allowing the interior of the inner chamber to be cooled when its temperature exceeds an upper threshold;
    a transport rack located above the tracks and that is connected to the housing; and
    a dump body provided on the transport rack.

2. The drive unit according to claim 1, further including at least one generator located within the inner chamber.

3. The drive unit according to claim 1, wherein the inner chamber is maintained at a positive pressure with reference to the atmospheric pressure.

4. The drive unit according to claim 3, wherein the track-driving motor is an internal-combustion engine supplied with fuel from a tank located inside the inner chamber.

5. The drive unit according to claim 4, wherein the engine includes an exhaust pipe, the exhaust pipe having a first end connected to the engine and a second end exiting outside of the inner chamber.

6. The drive unit according to claim 1, wherein the dump body is mechanically tilted using a motorized arrangement provided on the drive unit.

7. The drive unit according to claim 1, wherein the drive unit includes a rear platform to transport an operator.

8. The drive unit according to claim 1, wherein the air inlet of the ventilation circuit is located above the inner chamber.

9. The drive unit according to claim 8, wherein the air inlet includes apertures located on at least one exterior side of the drive unit.

10. The drive unit according to claim 1, wherein the motor is an electric motor powered by at least one battery located inside the inner chamber.

11. The drive unit according to claim 10, wherein the ventilation circuit of the inner chamber includes a thermostat to automatically switch on or off at least one fan.

12. The drive unit according to claim 10, wherein the inner chamber is maintained at a positive pressure with reference to the atmospheric pressure.

13. The drive unit according to claim 10, further including a handlebar connected to the housing.

14. The drive unit according to claim 1, wherein the ventilation circuit of the inner chamber includes a thermostat to automatically switch on or off at least one fan.

15. The drive unit according to claim 1, further including a handlebar connected to the housing.

16. The drive unit according to claim 15, wherein the handlebar is pivotally connected to the housing.

17. The drive unit according to claim 15, wherein the handlebar extends substantially rearwards with reference to the housing.

18. The drive unit according to claim 1, wherein the track-driving motor is an internal-combustion engine supplied with fuel from a tank located inside the inner chamber, the drive unit further including at least one generator located within the inner chamber and that is powered by the engine.

19. The drive unit according to claim 18, wherein the generator produces electricity to power one or more external equipment at a voltage corresponding to that of a domestic electrical outlet.

20. The drive unit according to claim 18, wherein the generator and the engine are mechanically connected through an electric clutch.

* * * * *